(12) United States Patent
Montgomery, Jr.

(10) Patent No.: US 7,499,468 B2
(45) Date of Patent: Mar. 3, 2009

(54) METHOD OF ADAPTING AN OPTICAL NETWORK TO PROVIDE LIGHTPATHS TO DYNAMICALLY ASSIGNED HIGHER PRIORITY TRAFFIC

(76) Inventor: Charles Donald Montgomery, Jr., 1432 Cross Bend Rd., Plano, TX (US) 75032

(*) Notice: Subject to any disclaimer, the term of this patent is extended or adjusted under 35 U.S.C. 154(b) by 979 days.

(21) Appl. No.: 10/602,145

(22) Filed: Jun. 24, 2003

(65) Prior Publication Data
US 2004/0057453 A1   Mar. 25, 2004

Related U.S. Application Data

(63) Continuation-in-part of application No. 10/118,084, filed on Apr. 8, 2002.

(60) Provisional application No. 60/282,318, filed on Apr. 6, 2001.

(51) Int. Cl.
*H04L 12/403* (2006.01)
*H04J 3/02* (2006.01)

(52) U.S. Cl. .................................. 370/453; 370/462

(58) Field of Classification Search ................ 370/450, 370/455, 459, 460, 449, 452, 462, 221–225; 398/30–32, 36
See application file for complete search history.

(56) References Cited

U.S. PATENT DOCUMENTS

| | | | | |
|---|---|---|---|---|
| 4,482,999 A | * | 11/1984 | Janson et al. | 370/452 |
| 5,349,583 A | * | 9/1994 | Christensen et al. | 370/434 |
| 5,497,374 A | * | 3/1996 | Maruyama et al. | 370/450 |
| 5,890,001 A | * | 3/1999 | Hall | 710/240 |
| 2006/0092958 A1 | * | 5/2006 | Tancevski | 370/404 |

OTHER PUBLICATIONS

T. E. Darcie, "Subcarrier Multiplexing for Multiple-Access LIghtwave Networks"; J. Lightwave Technol., LT-5 (8): 1103-1100, Aug. 1987.
A. Fumagalli et al., "A Token Based Protocol for Integrated packet and Circuit Switching in WDM Rings"; In Proc. Globecom '98, Sydney, Australia, Nov. 1998.
R. Olshansky et al., "Multigigabit, Multichannel Lightwave Networks Using Subcarrier Multiplexing"; J. High Speed Networks, 2(1): 63-79, Feb. 1993.

\* cited by examiner

*Primary Examiner*—Aung S Moe
*Assistant Examiner*—Kerri M Rose
(74) *Attorney, Agent, or Firm*—David W. Carstens; Carstens & Cahoon, LLP

(57) ABSTRACT

A system and method for dynamically establishing lightpaths in an optical telecommunications network. The system implements tokens which are used to advertise the availability of receivers downstream. The tokens notify a source when a transmission fails. The tokens also include lightpath reservations and indicate priority of reservations. The innovative system preferably comprises a ring topology with chords that connect non-contiguous nods of the ring.

19 Claims, 34 Drawing Sheets

1300

Nodes A, B, and C contend for D's lone RXR

Reference Network protocol procedure dependencies

RXR COUNT LIST record fields

Algorithm 0.0.2: UPDATE AVAIL RXR LISTS(*Global*, *Node*, *Token*)

if *rxr_lists* are empty      [block 0]
    then return if *Node* is on a lightpath      [block 1]
    then note *source* and *sink* for each $rec \in Node.add\_back\_rxr\_list$      [block 2]
do $\begin{cases} \text{increment } rec.adj \\ \text{increment } Token[rec.sink].\text{AVAIL\_RXRS} \\ \text{if } Token[rec.sink].\text{NUM\_FAILS} > 0 \\ \quad \text{then decrement } Token[rec.sink].\text{NUM\_FAILS} \\ \text{if } rec.adj = 0 \\ \quad \text{then delete } rec \end{cases}$ for each $rec_1 \in Node.take\_away\_rxr\_list$      [block 3]
do $\begin{cases} \text{decrement } rec_1.adj \\ \text{decrement } Token[rec_1.sink].\text{AVAIL\_RXRS} \\ \text{if } (Token[rec_1.sink].\text{AVAIL\_RXRS} + Token[rec_1.sink].\text{NUM\_FAILS}) < 0^a \\ \quad \text{then} \begin{cases} \text{increment } Token[rec_1.sink].\text{NUM\_FAILS} \\ \text{if } sink \text{ noted and } rec_1.sink = sink \text{ and } Token[rec_1.sink].\text{LINK} = \text{SINK}^b \\ \quad \text{then if no active TXN to } sink \\ \quad\quad \text{then } \begin{cases} \text{comment: TANDEM} \\ Node.on\_off[\lambda_i] \leftarrow \text{ON} \end{cases} \\ \quad\quad \text{else if } Token[sink].\text{LINK\_URG} \geq \text{ urgency of least urgent active TXN} \\ \quad\quad\quad \text{then } \begin{cases} \text{comment: STOMP} \\ Node.on\_off[\lambda_i] \leftarrow \text{ON} \\ \text{discontinue own least urgent active TXN} \\ \text{invoke } Failed\_TXN() \end{cases} \\ \quad\quad\quad \text{else } \begin{cases} \text{comment: SIPHON} \\ \text{reset lightpath from } sink \text{ upstream} \\ Node.on\_off[\lambda_i] \leftarrow \text{OFF} \\ Token[source].\text{TX\_FAIL} \leftarrow sink \end{cases} \end{cases} \\ \text{if } rec_1.adj = 0 \\ \quad \text{then } \begin{cases} \text{new } rec_2 \leftarrow (rec_1.sink, -(Global.num\_tokens)) \\ \text{add } rec_2 \text{ to } Node.add\_back\_rxr\_list \\ \text{delete } rec_1 \end{cases} \end{cases}$ ---
[a] if the sum of the AVAIL_RXRS and NUM_FAILS token fields for $rec_1.sink$ becomes negative ...
[b] if $rec_1.sink$ is the sink of a lightpath that was noted near the top of the algorithm ...

Figure 27

Algorithm 0.0.3: RESERVE LINKS PROCEDURE(*Token, Path*)

- create priority queue of destination *candidates*, sorted on primary key (most urgent), and secondary key (greatest hop-length)

while (1)

do $\begin{cases} \text{if queue empty} \\ \quad \text{then return} \\ \text{pop } candidate \\ \text{if every RSV\_URG of path to } candidate \text{ has lower urgency than } candidate \text{ burst} \\ \quad \text{then drop through WHILE loop} \end{cases}$ for each *link* on *Path* do $\begin{cases} \text{note "losing" reservation ID, if any} \\ \text{write "my" ID and MAXDEST urgency number} \end{cases}$ for each losing ID do $\begin{cases} \text{reset all reservations which are contiguous to new reservation link} \\ \qquad \text{and which have losing IDs (clear away "orphaned" IDs)} \end{cases}$

Figure 29

Algorithm 0.0.1: FIND PATH(*Global, Node, Token*)

if a TXR is available then $\Bigg\{$
- find *max* (the FREE link farthest downstream on *active ring*)
- *dest_list* ← all dests (with bursts waiting) incl. *max*[a]
- sort *dest_list*, by primary key (most urgent)  [3110]
  and secondary key (farthest)
- while (1)
  do $\Bigg\{$
  - if *dest_list* is empty
    then return
  - *dest* ← pop *dest_list*
  - if (∀ intermediate link, (*dest.urg* > *link*.RSV_URG)  [3118]
    and "grayed-out" links can be bypassed)  [3120]
    then break[b]
- if "grayed-out" links on path  [3130]
  then $\bigg\{$ *Token.RI* ← largest available bypass ring (RI)
  if new RI changes the route at thisnode, set switch
- decrement *Token*[*dest*].AVAIL_RXRS
- *arrec* ← (*dest, Global.num_tokens* − 1)
- add *arrec* to *Node.take_away_rxrs_list*
- *mark_path(dest, dest.urg)*

---

[a]Recall that node information appears on the token in the same record with its upstream link.

[b]The break statement is unconditional, except in RESERVATION_SCHEME (first condition) and MESH (second condition).

Figure 31

METHOD OF ADAPTING AN OPTICAL NETWORK TO PROVIDE LIGHTPATHS TO DYNAMICALLY ASSIGNED HIGHER PRIORITY TRAFFIC

RELATED APPLICATION

The present application is a continuation-in-part of parent application U.S. Ser. No. 10/118,084 filed on Apr. 8, 2002, and claiming a priority date of No. 60/282,318 filed on Apr. 6, 2001. This application incorporates the disclosure of U.S. Ser. No. 10/118,084 by reference.

BACKGROUND OF THE INVENTION

1. Technical Field

The present invention relates to data transmission, to fiber optic data transmission, and more particularly to the use of optical burst switching to provide an optical networking system.

2. Abbreviations

Certain terms are hereby defined as used in this specification.

OBS: optical burst switching

APS: automatic protection switching

TXR: transmitter

RXR: receiver

TXN: transmission

Tell-and-go, or TAG: a scheme for allocating paths through a networking system in which a node does not check with any external authority to gain permission before transmitting.

Reference Network: the inventive work disclosed in patent application Ser. No. 10/118,084.

MESH: those portions of the protocol and structure disclosed in the present application which have to do with adapting and extending the Reference Network to function in a network topology which has more links than a ring topology.

Outer network, outer protocol: those portions of the structure and functionality disclosed in the Reference Network patent application which have to do with protection and survivability, plus the MESH structure and functionality disclosed here.

Inner network, inner protocol: those portions of the structure and functionality of the Reference network, along with inventive work disclosed here, exclusive of protection, survivability, and mesh structure and functionality. The inner network comprises five "layers." Starting with the lowest layer, the functionality and structure of the five layers builds each upon the last.

FIXED: the first, lowest layer of the inner network, disclosed in the Reference network.

TUNABLE: the second layer of the inner network.

TANDEM: the third layer of the inner network.

URGENCY: the fourth layer of the inner network.

RESERVATION: the fifth layer of the inner network.

Low-power network: any network or protocol which includes the TUNABLE or higher layers of the inner network.

active ring: for a given channel, the particular ring upon which the network is advertising available paths. Only one active ring is allowed per channel at any given moment. The active ring is the only ring upon which a path may be set up. The active ring may be changed on the fly by the node with the token-in-hand when certain criteria are met.

Ring Identifier, or RI: a field added to the token, identifying which ring is currently the active ring. (The term "RI" may be used as shorthand for an active ring.)

primary ring: a distinguished Hamiltonian cycle in a given network of nodes. (An Hamiltonian cycle is a closed path, with no node visited twice, and every node visited once. The fact that each link in the cycle is traversed once and only once is implicit. More than one Hamiltonian cycle may exist in the same network. The primary ring is simply one of these.) The primary data cycle for a channel.

chord: a link in the network which does not lie on the primary ring.

contraction: a change in the data cycle ("active ring") to bypass certain nodes and links by routing across a chord.

bypass: the chord used in a contraction, or the contraction itself.

expansion: a change in the data cycle to include certain nodes and links that were formerly excluded by contraction.

snapback: expansion.

available rings: all the rings usable for a particular wavelength, including the primary ring and a pre-computed, globally known subset of rings made possible by the available chords.

grayed-out: a term referring to the status of COMMPATH records which are on the primary ring but not on the active ring.

ONEROTATION: the time or distance involved in one complete rotation of a token around the networking ONEROTATIONBITS: the number of bits that can be transmitted in ONEROTATION time

3. Description of Related Art

Customers can access a network from a variety of locations. For example, a customer might enter a network from the Internet or a public switched telephone network (PSTN). That customer might request a transfer of data from a variety of sources. These sources might include a storage area network (SAN), a wide area network (WAN) or a local area network (LAN) that is also connected to the network. A number of network architectures have been developed to assist the transfer of data from such a source to such a sink.

A typical network architecture is shown in FIG. 1 (0100) and has one or more network nodes (0101, 0102, 0103, 0104) having primary (0111, 0112, 0113, 0114) and/or secondary (protective) (0121, 0122, 0123, 0124) communication data links. For purposes of the present application, the term communication channel shall be designated $C_i$ where i takes on any value from 0 to (W+1). Each link, for instance link 0121, can include a number of communication channels ($C_0$ to $C_{W+1}$). Likewise, a communication path can be established from one node to another over these links via a given channel $C_i$.

While the present invention is particularly amenable to applications in situations where ring networks as illustrated in FIG. 1 (0100) are implemented with three or more nodes, it is also applicable to situations where point-to-point network communications are implemented. Additionally, while the focus of many preferred embodiments of the present invention concentrates on optical communications (including Synchronous Optical Networks (SONET) and associated topologies), the present invention is not limited to the use of optical fiber as the communication medium.

4. Unidirectional Path-Switched Ring (0200, 0300)

Referencing FIG. 2, a topology for a SONET ring called a unidirectional path-switched ring is illustrated (0200). This ring uses two optical fibers (0201, 0202) and is configured such that each fiber channel sends communications traffic in one direction such that the direction of communications is opposite between the two fibers (0201, 0202).

The network elements (0231, 0232, 0233, 0234) are generalized communication sources/sinks in this topology, and should be considered as such in the context of the present invention. The network interface modules (0211, 0212, 0213, 0214) generally represent a number of multiply redundant communication ports that permit multiplexing of received data from one of several ports in the event of a node or path failure. Multiplexing functions (0221, 0222, 0223, 0224) are generally performed electrically but may also be optically actuated. Note especially that SONET technology is a hop-by-hop system, where optical transmission is terminated at each node for electronic processing of every signal, and that the control and signaling information is in-band, i.e., the data frames themselves contain "overhead" information which is used for operations, administration, management & protection functions (OAM&P).

While the topology illustrated in FIG. 2 (0200) provides some insight into how data is transmitted from node to node during normal operation, the topology under link failure conditions in which a fallback/recovery mode of operation is activated may be seen in FIG. 3 (0300). Here the link failure has been introduced between two network interface units (0312, 0313). This failure prompts the network system management components to reconfigure the multiplexer switches (0321, 0322, 0323, 0324) to avoid the failing link if possible. Redirection of the receive data switch (0323) permits the network to recover from this condition and still permit transmit and receive connectivity to be maintained between all nodes in the network. This reconfiguration process is not instantaneous, however, and the network elements (0331, 0332, 0333, 0334) will experience some degree of latency during the crossover of the receive data switch (0323). Furthermore, while this topology provides for secondary (protective) communications backup capacity, it makes no provision for the idle bandwidth in these communication channels to be actively used by the network. Furthermore, SONET topology assumes that a given link is either "lit" or "dark", meaning there is no provision for graceful degradation of a communication channel link in this paradigm. Neither is there a provision for the "part-time" usage of a communication channel in this paradigm.

5. Bi-Directional Line-Switched Self-Healing Ring (0400)

Another SONET ring topology that is widely used in the prior art is termed Bi-Directional Line-Switched Self-Healing Ring (BLSR) and is illustrated in the four-fiber ring of FIG. 4 (0400). In this configuration, some of the fiber is acting as stand-by (protection) (0411), in the event that the working fiber (0412) (or a node) fails. The protection copy (0411) becomes the working copy (0412) and traffic is diverted around the problem should a failure occur using the add/drop multiplexers (ADMs) (0401, 0402, 0403, 0404). As with all SONET approaches, this approach makes for a very robust system and provides high reliability, albeit at the increased cost of the addition of redundant fiber links (0411), and at the significant cost of electronic equipment, electrical power supply, footprint (space requirements) and air conditioning to process all data electronically at each node. Indeed, these drawbacks obtain with all current hop-by-hop, full optical-to-electronic-to-optical signal conversion approaches.

6. Fault-Tolerant Switching Methods (0500)

Since optical fiber has a very large bandwidth and associated information carrying capacity, along with the capability of supporting a wide variety of simultaneous logical data connections, the loss of the fiber can be a serious event causing considerable disruption and economic loss. Two common approaches to solving this link loss problem are illustrated in FIG. 5 (0500).

One approach is called Line Protection Switching or 1:1 Switching (0501). This configuration (0501) consists of two point-to-point fiber pairs between two network elements (0521, 0522, 0523, 0524 and 0510). If the working fiber is lost or the signal degraded, the protection pair assumes the job of carrying the traffic between the network elements. In a fully protected system, this configuration requires four fibers (two transmit and two receive per network interface).

Another approach is called 1+1 Protective Switching (or Path Protection Switching (PPS)) in which the switching takes place at low speed or via control input to the network element (0502). With this arrangement, the traffic is sent on both the working and protective fibers. The two copies of the traffic are received at the receiving network element (0541, 0542, 0543, 0544 and 0530). Here, they are compared, and only the better copy is used.

An example of this methodology in action might configure a fiber to carry 48 channels with channels 1-24 dedicated for payload traffic and channels 25-48 used for protection. In the event one of the working channels is faulty, the receiving network element (0541, 0542, 0543, 0544 and 0530) will replace it with the other copy on the corresponding protection channel. This approach is quite fast and does not result in any loss of traffic. Problem restoration is quite efficient and the other 23 channels are not affected.

The concepts behind 1:1 and 1+1 protection have been generalized for DWDM networks to mean not just the point to point fiber pairs, but the aggregated links of the entire end-to-end lightpaths.

7. Path Protective Switching (0600, 0700, 0800)

FIGS. 6, 7 and 8 provides an example where a PSTN acts as part of the network. A central office of the PSTN can act as a node on the network. A typical path protective switching topology under normal operating conditions (0600) permits data to flow from the initial network interface (0622) through a good path to another network interface (0621), then through the central office (0610) to the telecommunications network.

Referencing FIG. 7, a typical path protective switching topology under node failure conditions (0700) permits data to flow from the initial network interface (0722) through an alternate path to another network interface (0723, 0724), then through the central office (0710) to the telecommunications network. Here since the node (0721) is down the signal is diverted to an alternate path by the upstream node (relative to the failed node (0721)).

Referencing FIG. 8, a typical path protective switching topology under link failure conditions (0800) permits data to flow from the initial network interface (0822) to a downstream node (0821) through an alternate path via network interface (0822) to another network interface (0823, 0824), then through the central office (0810) to the telecommunications network. Here since the path is down the signal is diverted by the downstream node (0821) (relative to the failed link).

In all these cases the shared protection ring can reconfigure and recover from a node or fiber failure. The switching necessary to achieve this functionality is generally implemented by multiplexer configurations similar to that illustrated in FIGS. 2 and 3 (0221, 0222, 0223, 0224, 0321, 0322, 0323, 0324).

8. Path Protection Ring Recovery Operations (0900, 1000)

Path protection switching (PPS) is generally achieved by using fields in the transmission overhead headers. In other words, the transmission specific information, i.e. destination node information, is included in each frame of data. As illustrated in FIG. 9 (0900), during normal operations of a 1+1 protection scheme, signals are placed on both fibers (0901, 0902) so that the protection fiber (0901) carries a duplicate copy of the payload, but in a different direction, and as long as the signals are received at each node on these fibers (0910, 0920, and 930), it is assumed all is well.

When a problem occurs, as illustrated in FIG. 10 (1000), such as a fiber cut between nodes B (1020) and C (1030), the network changes from a ring (loopback) network to a linear network (no loopbacks). In this example (1000), node B (1020) detects a break (1003) in the fiber, and sends an alarm to the other nodes on the working fiber (1002). The effect of the signal is to notify node C of the problem. Since node C (1030) is not receiving traffic on the protection fiber from node B (1020), it diverts its traffic onto the fiber. Node B (1020) then uses the protection fiber (1001) for this traffic Node A (1010) continues to operate as normal.

9. "Bursty" or Self-Similar Data Traffic

There is a significant difference between voice and data traffic. Voice traffic, such as telephone calls between voice network subscribers, can be very accurately modeled. This allows network planners to more easily size the capacity of a voice network infrastructure. In contrast, modern data communication traffic is far more bursty" (self-similar) than previous data traffic, in that there is more temporal self-information associated with the data than in the past. The difference between bursty and non-bursty traffic is shown in FIG. 11. Voice traffic (1102) appears bursty over very short time frames (1110). However, as the time frame increases or there is an aggregation of multiple channels of voice traffic, the data rate (1112) shown on the y-axis becomes smoother. In other words, there are fewer peaks that exceed the average aggregated data rate. However, data traffic (1104) is bursty in both short and long time intervals, and remains bursty even when aggregated with other data channels. A useful statistic in appreciating this phenomenon is that, in data networks, such as Ethernets, the peak load may often exceed the average load by a ratio of 100:1 or more. A network with statically allocated capacity that is not designed to handle the extreme peaks of the bursty traffic will not be able to throughput those peak data loads efficiently. However, designing a network that can handle even the greatest peak data rate is overly expensive and underutilized during non-peak traffic. Therefore, a need exists for a method of dynamically allocated bandwidth to handle peak data rates.

Traditional models associated with the telecommunications industry have placed both a premium and a limit on the self-information (burstiness, or ratio of peak load to average load) associated with a variety of frame relay transmission schemes. These scenarios are best summarized in the VOICE & DATA COMMUNICATIONS HANDBOOK by Regis J. Bates and Donald W. Gregory (2000, ISBN 0-07-212276-5, page 642) as follows:

"When designing a frame relay service, the speed of access is important both prior to and after installation. The customer must be aware of the need for and select a specified delivery rate. There are various ways of assigning the speed from both an access and a pricing perspective. For small locations, such as branch offices with little predictable traffic, the customer might consider the lowest possible access speed. The frame relay suppliers offer speeds that are flat rate, usage sensitive, and flat/ usage sensitive combined. The flat-rate service offers the speed of service at a fixed rate of speed, whereas the usage-based service might include no flat-rate service, but a pay-as-you-go rate for all usage. The combined service is a mix of both offerings. The customer selects a certain committed information rate (CIR). The committed information rate is a guaranteed rate of throughput when using frame relay. The CIR is assigned to each of the permanent virtual circuits (PVC) selected by the user. Each PVC is assigned a CIR consistent with the average expected volume of traffic to the destination port. Because frame relay is a duplex service (data can be transmitted in each direction simultaneously), a different CIR can be assigned in each direction. This produces an asymmetrical throughput based on demand. For example, a customer in Boston might use a 64 Kbps service between Boston and San Francisco for this connection, yet for the San Francisco-to-Boston PVC a rate of 192 Kbps can be used. This allows added flexibility to meet the customer's needs for transport. However, because the nature of LANs is that of bursty traffic, the CIR can be burst over and above the fixed rate for 2 seconds at a time in some carriers' networks. This burst rate (Br) is up to the access channel rate, but many of the carriers limit the burst rate to twice the speed of the CIR. When the network is not very busy, the customer could still burst data onto the network at an even higher rate. The burst excess rate (Be) can be an additional speed of up to the channel capacity, or in some carrier's networks it can be 50 percent above the burst rate. Combining these rates, an example can be drawn as follows:

Total Throughput=CIR+Br+Be

320 Kbps total=128 Kbps+128 Kbps+64 Kbps"

Thus, while the prior art permits an increase in the overall data transfer rate for short periods of time, what is not taught is any method to dramatically increase the apparent system throughput by pooling the capacity of all of the avialable communication channels, utilizing this as a resource for additional bandwidth, and allocating bursts of bandwidth to match the bursts of demand, while still maintaining protection and fallback mechanisms.

10. Network Design and Planning

The prior art (see TELECOMMUNICATIONS ENGINEER's REFERENCE BOOK by Fraidoon Mazda (1998, ISBN 0-240-51491-2, page 22/13)) teaches that "The first consideration when specifying any data communications network is to establish the nature and rates of traffic which the network will be expected to support both in the short and the long term. This is crucial to all network design and is the starting point of all network decisions. If errors are made here, the network cannot be expanded to meet new (and possibly unexpected) requirements."

Thus, the prior art teaches that proper planning with foresight to the future is necessary to properly design a modern communications network. However, the real problem with this philosophy in modern networks is the exponential increase in demand for bandwidth that is currently being experienced by the telecommunications industry. For example, FIG. 12 illustrates the projected growth curves (1200) being by Internet data traffic (1202). Note that the improvements in SONET capacity using time division multiplexing (TDM) (1204) is not pacing data demand. Likewise, FIG. 13 shows the projected growth rate in processing capacity (1300) of nodes in data networks. To further emphasize the exploding growth rates in data traffic, please note that the y-axis in FIGS. 12 and 13 are logarithmic. Planning in such an environment is difficult if not impossible. Couple the increased demand for bandwidth with the inherent bursty nature of the data being transmitted, and this further aggravates an already worrisome problem.

Mazda goes on to distinguish various types of data communications traffic as follows:

18 Stop-start traffic in the form of lots of short packets traveling in one direction often with slightly longer packets in the reverse direction. A characteristic of this type of traffic is that it is often associated with a requirement for very short turn-around and transit delays (e.g. word-processing). This is a classical form of asynchronous traffic.

19 'Forms' traffic where a small amount of data travels in one direction on an ad hoc basis, but it is answered with a stream of traffic in the other direction (database enquiry, web server request).

20 Block mode traffic, where there is a stream of large full packets traveling in one direction with short packets traveling in the other (file transfer).

21 Transaction traffic where there are high numbers of calls with limited data transfer, often done with the Fast Select facility (e.g. credit card checks, holiday booking lounges).

22 Optimized traffic, where many users are sharing a single connection (often using a Transport connection). Optimization is achieved by filling the packets as full as possible without degrading the class of service below the user requirements (OSI).

23 Priority traffic. This may be any of the traffic types described above but takes precedence over the normal data flowing in the network.

24 Management traffic, which is any overhead in any network.

25 Multimedia traffic, such as video.

26 Compressed voice traffic.

A corporate or public data network would handle all these types of traffic (and more). Most small private networks will only have one or two types of traffic and are often designed and tuned to those specific requirements. The list above is not intended to be comprehensive, but to give an idea of the differing traffic types that exist.

Service provider traffic is about 50% voice and 50% data. Studies show that data will account for as much as 96% of service provider traffic by 2005, doubling approximately yearly. With this exponential increase in network traffic loads, it is widely believed that the time has come for applying wavelength division multiplexing (WDM) not only to long-haul networks, but to metropolitan area networks (MANs), and even to access and/or campus networks. Unlike the longer-term stability seen in the traffic load in WANs (which is at least partially due to the difficult and lengthy manual set-up of expensive, leased connections), it is nearly impossible to foresee the traffic load or traffic pattern in MANs. To utilize the capacity efficiently, dynamic bandwidth on demand becomes a very important consideration in optical MANs. However, existing methods are at best web-based point-and-click (think "switchboard operator") provisioning, and more often manual ("truck roll") provisioning, which need at least minutes (more often days, weeks, or months) to establish lightpaths, and thus cannot meet the challenge of the bursty traffic in MANs.

Burstiness (self-similarity) is a fundamental characteristic of data traffic. In Ethernet based, data networks, indeed in Internet traffic in general, traffic has been shown over recent years to exhibit a family of related phenomena variously known as self-similarity, long-range dependency (LRD), fractal distribution, or simply burstiness. Burstiness dramatically complicates the business of designing data networks, since traditional assumptions about sizing network links no longer fit the actual data flows, and new models that work with circuit switched networks (e.g., voice networks) have not been found. This difficulty is compounded by the fact that network data flows are not symmetrical, again differing from voice traffic. Unlike voice network traffic, which becomes predictable when enough sources are aggregated together, data traffic remains bursty at all levels of aggregation, and over all timescales. The implication for network design is that data traffic cannot be adequately supported by current and proposed optical networking systems offering statically allocated, symmetrical connections. In other words, simply allocating big pipes will not allow adequate network dimensioning, since any static allocation of capacity will not adapt to "point loads" or transient traffic spikes. Further, pipes big enough to carry a bursty load some large percentage of the time will be severely underutilized most of that time. This is crucial, since data traffic, and IP traffic in particular, is expected to come to dominate networks over the next few years, with overall network traffic growth rate doubling or quadrupling every year. Since pipes big enough to handle the transient peak loads (bursts) of data traffic are empty most of the time, current optical solutions carry data on networks designed for voice; such networks exhibit extreme underutilization.

Existing metro/regional systems are overwhelmingly based on the ring topology, due to the level of familiarity and carrier comfort stemming from the long-standing adoption of SONET (an optical communications standard) rings, and due to the survivability and speed of recovery available from WDM self-healing rings (SHRs). However, OEO conversion itself can be a bottleneck, requiring very costly high-speed elements, a large equipment footprint, high energy consumption, special air conditioning, etc.

With the most advanced optical circuit-switching systems deployed today, the physical delay involved in lightpath setup and tear-down is on the order of ten milliseconds or more; network management overhead may add orders of magnitude to this delay. To support microsecond-scale lightpath setup and tear down, as well as efficient fault tolerance and cost-effectiveness, a new system for supporting high-speed WDM optical transmission is required.

Optical packet switching (OPS) would give optical networks the flexibility and granularity currently available in packet switched electronic networks. But OPS is currently a laboratory exercise, and is not practical in the short or middle term.

Proposed optical burst switching (OBS) is an intermediate solution, offering some of the advantages of both OPS and current "circuit switched" optical networks. OBS involves a one-way reservation of bandwidth (i.e., no ACK required before transmission), and optical cut-through ("switch cut-through") of transparent data, i.e., no conversion of data to electronics at intermediate nodes. The type of bandwidth release used differentiates the various OBS approaches. Full opto-electro-optical (OEO) conversion of an out of band control channel further characterizes OBS. Since OBS network ideas are designed "from the ground up" to transmit bursts of data efficiently, OBS offers a compelling solution to some of the problems associated with bursty traffic.

One proposed OBS scheme, the "Tell and Go" prior art (Fumagalli et al., details below) has compelling advantages: no waiting for ACKs before transmitting, out of band signaling, no OEO conversion of data, a ring topology amenable to survivability, and distributed state. But there are drawbacks: the expense of transmitters and receivers on each wavelength at each node, no enforcement of fairness, the lower degree of connectivity that comes with a ring topology, and the inability to distinguish contiguous paths from the bitmask token.

The Reference Network and its extensions—the inventions disclosed here—build on ideas and architecture, now in the public domain, described in A. Fumagalli, J. Cai, I. Chlamtac, "A token based protocol for integrated packet and circuit switching in WDM rings," published in *Proceedings of Globecom* 1998; which in turn compiles and incrementally moves beyond the public domain ideas of sub-carrier multiplexing (SCM: Mid-1980's) and fiber delay line optical ring architectures. (DARPA's CORD project test-bed, early 1990's). (Note, the Fumagalli scheme differs from IEEE 802.5 token ring and FDDI (Fiber Distributed Data Interface) due to its simpler station management and its simpler out-of-band traffic control, which are better suited for high-speed WDM transmission. Note specially that the IEEE 802.5 token ring cannot be used in larger rings, since, according to the standard, a station cannot generate a new token until its frame has made a complete circuit of the ring. FDDI overcomes this to some extent by allowing a node to put a new token back onto the ring once it has finished transmitting its frames. But FDDI is not suited for much more than a 100 Mbps LAN backbone, since the station management and traffic control methods, e.g., in-band source and destination addressing, synchronous frames for circuit-switched PCM or ISDN data, the three token holding timers, etc., are too complicated. While FDDI could work well at 100 Mbps, generalizing the idea to support WDM transmission at much higher speeds is improbable.)

11. Fumagalli's WDM Method

In "A TOKEN BASED PROTOCOL FOR INTEGRATED PACKET AND CIRCUIT SWITCHING IN WDM RINGS," by A. Fumagalli, J. Cai, and I. Chlamtac, published in Proceedings of Globecom 1998, in a wavelength division multiplexed ring (1400) of W+1 channels, N nodes, and N optical links, there are W data channels, and 1 token (control/signaling) channel. The W tokens each represent a single data channel, and all tokens circulate on the token channel, which is terminated at each node. Each token consists of a channel identifier and an N bit bitmask; and advertises the availability of each link for its particular channel by a 0 to represent availability, and a 1 to represent being in use. At each node, the data channels are optically demultiplexed, and passively tapped for possible reception.

FIG. 14 illustrates a node (1400) under the Fumagalli scheme. For each of the W data channels, the node has one fixed transmitter (1402), one fixed receiver (1404), and one on/off switch (1406). For ease of illustration, only four data channels are shown here. Today, on the order of two hundred wavelength channels are multiplexed per fiber, and this number is increasing very rapidly.

The on/off switches are used to control the flow of optical signals through the node, and can prevent the circulation of "spent" packets in the ring. The optical delay line (1408) at each node is used to delay the data transmission, giving the node enough time to process the control packet (token). The information on the control channel (1410) is handled by a controller (1412). A buffer of sufficient size is provided at each node for data processing (1414) to queue incoming (internetwork) transmissions prior to their transmission into the ring (intra-ring) and outgoing (extranetwork) transmissions prior to their transmission out of the ring. Though this design is somewhat similar to IEEE 802.5 token ring and FDDI (Fiber Distributed Data Interface), the simpler station management and, especially, the simpler out-of-band traffic control are much more suitable for high-speed WDM transmission.

Using this scheme, a node that has data to transmit simply claims the available communication path, sets the appropriate fields in the token (if a link is to be claimed for a communication path, the bit corresponding to that link is set to 1 to reflect this), and releases the token and the data for transmission downstream simultaneously. The node does not need to check with the other nodes or any central authority. This is known in the literature as a "tell-and-go" (TAG) scheme. The destination node receives the token on the token (control) channel while the data is delayed on the data delay loop (1408), monitors the receiver that taps that channel to receive the data, and opens the ON/OFF switch (1406) on that channel to prevent interference downstream, and thereby "clean up" that data channel. Meanwhile, upon completion of its transmission, the source node waits for the token to return and then regenerates the token, clearing the fields corresponding to its communication path. This protocol is fully distributed, i.e., there is no central network controller.

SUMMARY OF THE INVENTION

The present invention is grouped into three related categories for ease of explanation. They combine to from the innovative system and method of providing paths to dynamically assigned, more urgent traffic, to avoid unfairness and starvation. It should be noted that the three aspects of the present invention can be implemented on a stand-alone basis or together.

The purpose of the first aspect is to allow the Reference Network to function in a situation where the number of transmitters and/or receivers per node is less than the number of wavelengths available. It is preferably used by adapting and extending the Token, Protocols, and Architecture of the Reference Network to dynamically establish the availability of receivers; adaptations are described to account for receivers/transmitters that can only tune to a limited waveband. Due to the high cost of optical transmitter-receiver pair systems, it is not expected to be economic to deploy large numbers of such pairs on a sometimes sparsely trafficked network, e.g., on every wavelength of every link of a ring network like the Reference Network.

This "transmitter/receiver restricted network invention" includes the ability to extend the Reference Network to a situation where many channels are available, but not so many transmitters and receivers are available, and still allow on-demand requisitioning of paths through the network. One common restriction of tunable filters (a vital part of the implementation of so-called "tunable receivers") is an ability to tune only within a limited spectrum, or waveband. The "transmitter/receiver restricted network invention" is easily adapted to this additional constraint. We will refer to this tunable "transmitter/receiver restricted network invention" as the TUNABLE_SCHEME or TUNABLE network in the detailed description below.

The purpose of the second aspect is to allow the Reference Network to maintain fairness and avoid starvation. It is used by adapting and extending the Token, Protocols, and Architecture of the Reference Network to enforce availability of paths to dynamically assigned higher urgency traffic.

This "QoS invention" includes the protocol mechanism extending the Reference Network to assure fairness and lack of starvation even as service degrades under heavy load (so-called "graceful degradation"). We will refer to this tunable "QoS invention" as the RESERVATION_SCHEME or RESERVATION network in the detailed description below. Additionally, we shall describe in detail below the "inner network/inner protocol," which subsumes the functionality and structure of TUNABLE and RESERVATION.

The purpose of the third aspect is to allow the Reference Network to function in a situation where a network topology more connected than a ring is desired, in order to allow traffic to bypass congestion, to balance loads, to enhance survivability, to extend QoS functionally, to enable dynamic traffic engineering, and/or to support bandwidth management. It is used by adapting and extending the Token, Protocols, and Architecture of the Reference Network to support a mesh topology, that is, a topology which is more connected than a ring.

This "mesh" (also referred to here as MESH) invention includes the extensions of the Reference Network to allow temporary partition of the network on a per wavelength basis to allow bypass of congested sections; the ability to configure the Reference Network on a wavelength by wavelength basis; support for traffic engineering based on load, protection/survivability needs, QoS needs, support for "ripple updates" of off-line reconfiguration computations; and support for protection on a per wavelength granularity.

The inventive work presented here is further organized into Inner and Outer portions. The Inner network contains the core functionality and structures. The Inner network comprises those portions of the Reference network which do not relate to protection and survivability, and those portions of the present invention which do not relate to the MESH structure and functionality. The inner network is further divided in five "layers" (from lower to higher): FIXED (so-called because the tuning of each transmitter and receiver is "fixed" to a single channel), TUNABLE, TANDEM, URGENCY, and RESERVATION. After the lowest layer, FIXED, each layer of the Inner protocol builds, in turn, on the layer below it to provide added functionality. The FIXED, TUNABLE, and TANDEM layers together form the "transmitter/receiver restricted network invention." Additionally, we will refer to any network incorporating the TUNABLE layer (i.e., all except a FIXED network) as a "low-power network."The FIXED, TUNABLE, TANDEM, URGENCY, and RESERVATION layers together form the "QoS invention." The Outer network comprises those portions of the Reference network and the present inventive work exclusive of the inner network, including the protection/survivability structure and function of the Reference network and the MESH structure and functionality disclosed here. The MESH layer involves changes and additions to the inner network protocol, and structural changes. The MESH layer is not integrated with the protection and survivability structure and functionality of the Reference Network.

The Reference Network and its innovative extensions implement OBS to provide a flexible, low-delay, optical networking system. Parallel wavelength channels are used as a shared resource, and statistical multiplexing of optical bursts over a set of wavelength channels allows tremendous efficiencies, as compared to the current, static, independently managed case. Many technical advantages accrue to this approach. Nodes may be asynchronous, QoS may be implemented with prioritized classes of service, optical cut-through drastically reduces the delay and expense of electronic forwarding, and control and data traffic may be decoupled to allow network data transparency. In the case of fiber abundance, this architecture may combine multiple fibers per link with extremely low-cost optical components, or optionally manage a waveband of DWDM wavelengths leased from a wholesaler's fiber plant.

These innovations have commercial application in the development, construction, marketing, and sale of optically switched, out-of-band controlled, data communications network elements and systems. A data communications network of such elements may offer greatly reduced cost and increased flexibility of data transfer.

The present innovations have a potential market in telecommunications and data communications (telecom/datacom) equipment manufactures, said inventions collectively constituting a key enabling technology for fast circuit switching and/or burst switching of end-to-end lightpaths through a network of like network elements.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 27 shows the Update AVAIL RXR LISTs Procedure;

FIG. 29 shows the Reserve Links Procedure;

FIG. 31 shows the Find Path Procedure (URGENCY, RESERVATION);

DETAILED DESCRIPTION OF THE INVENTION

Figure 1:
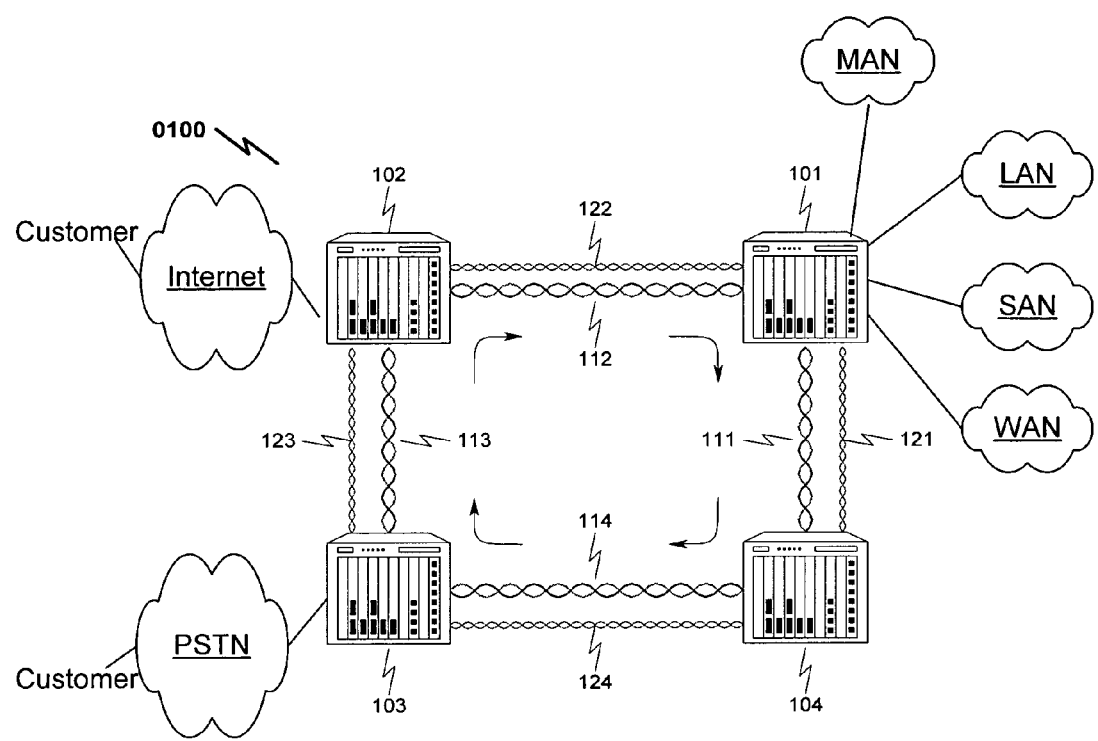
FIG. 1 illustrates a standard network architecture in which the present method can operate.
Figure 2:
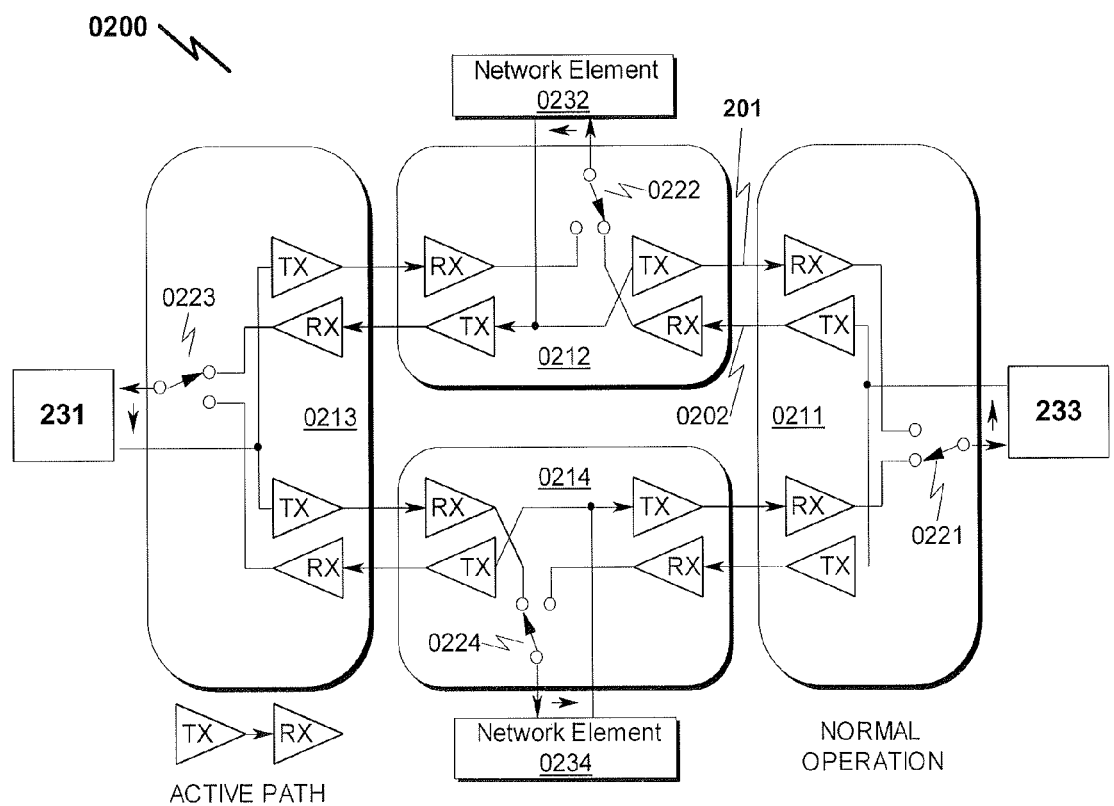
FIG. 2 illustrates a prior art unidirectional path-switched ring under normal operating conditions.
Figure 3:
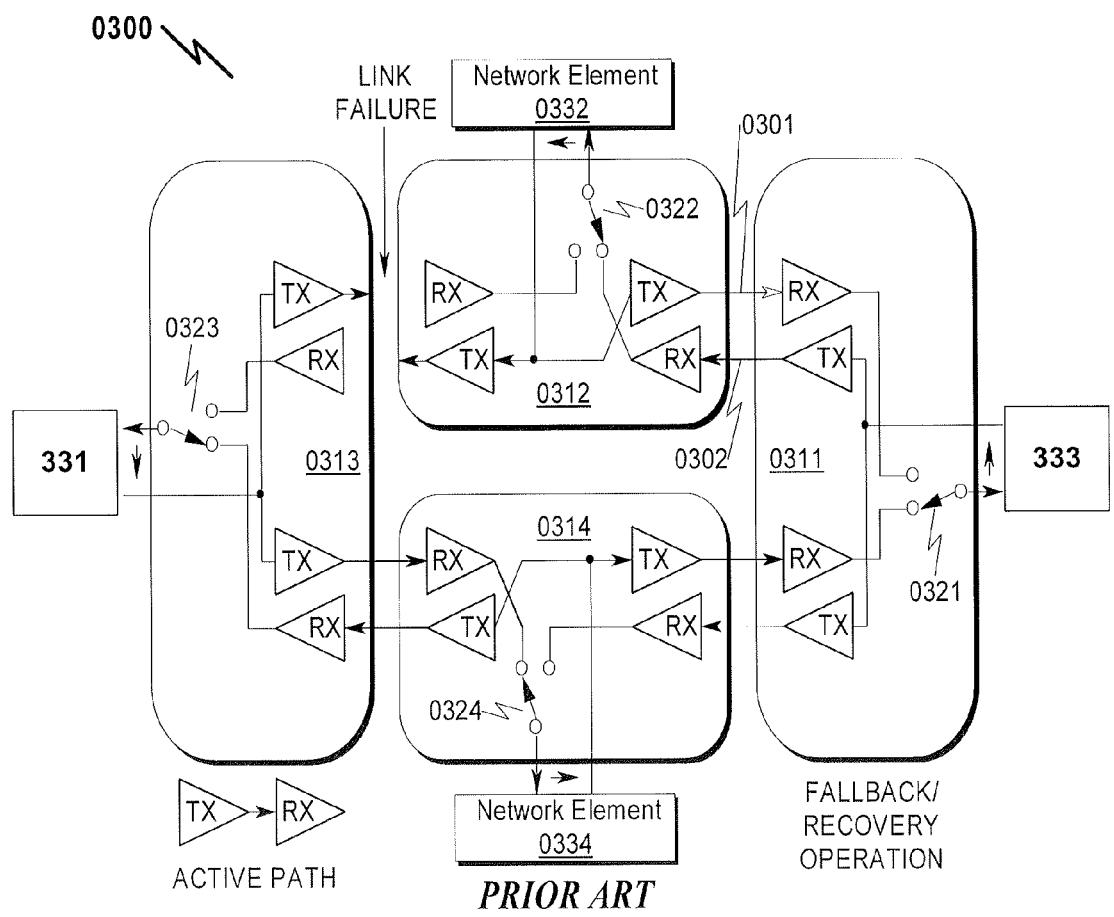
FIG. 3 illustrates a prior art unidirectional path-switched ring under link failure conditions.
Figure 4:
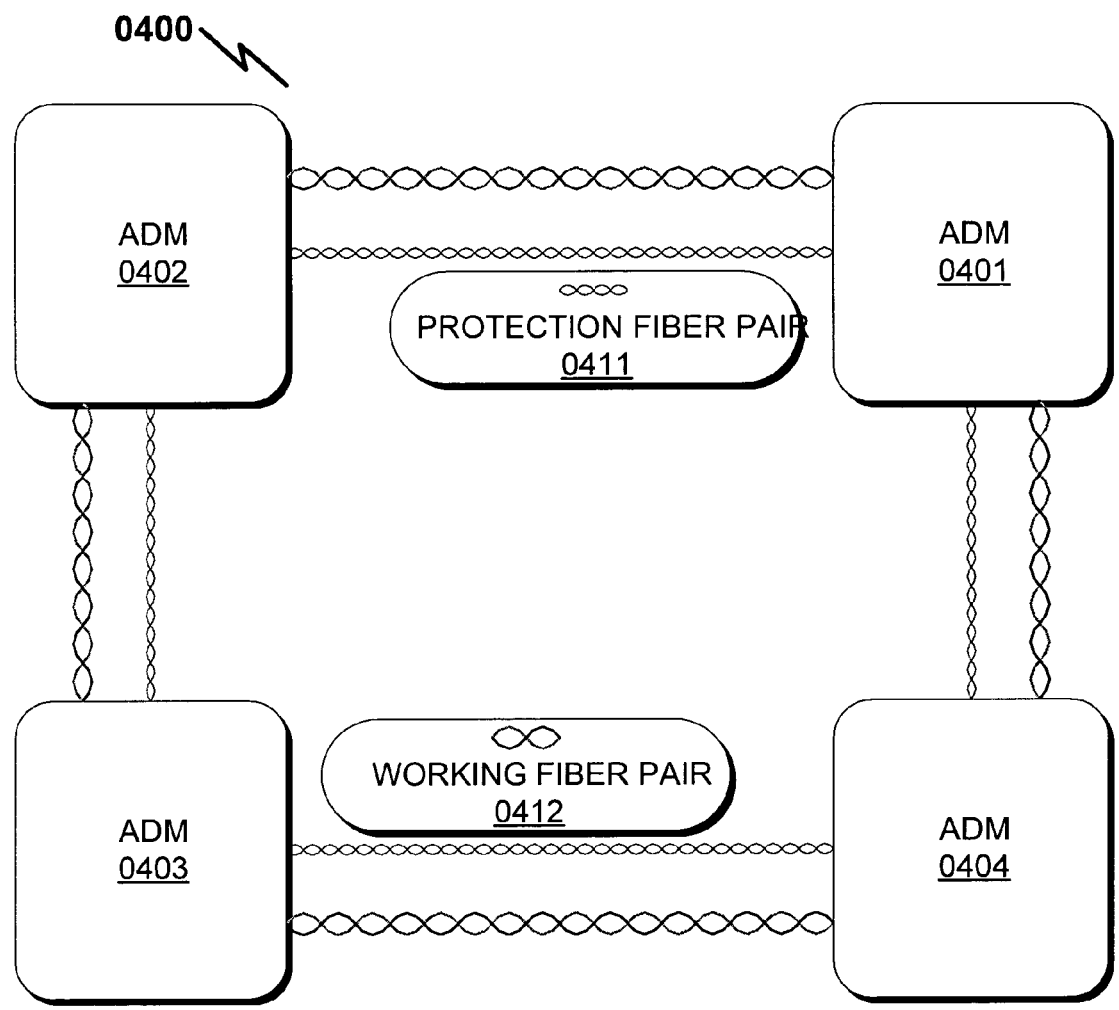
FIG. 4 illustrates a prior art bi-directional line-switched self-healing ring.
Figure 5:
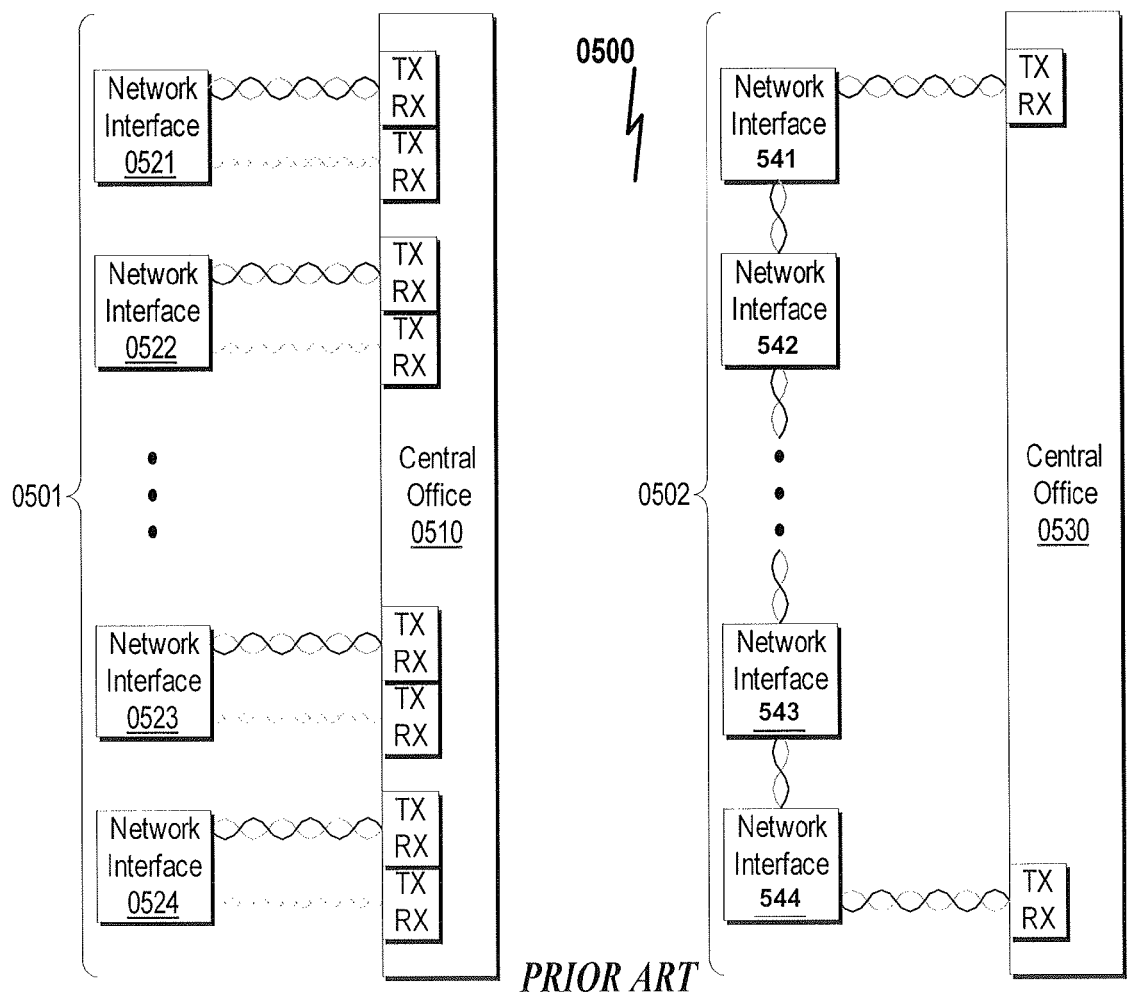
FIG. 5 illustrates several examples of prior art fault-tolerant switching methods.
Figure 6:
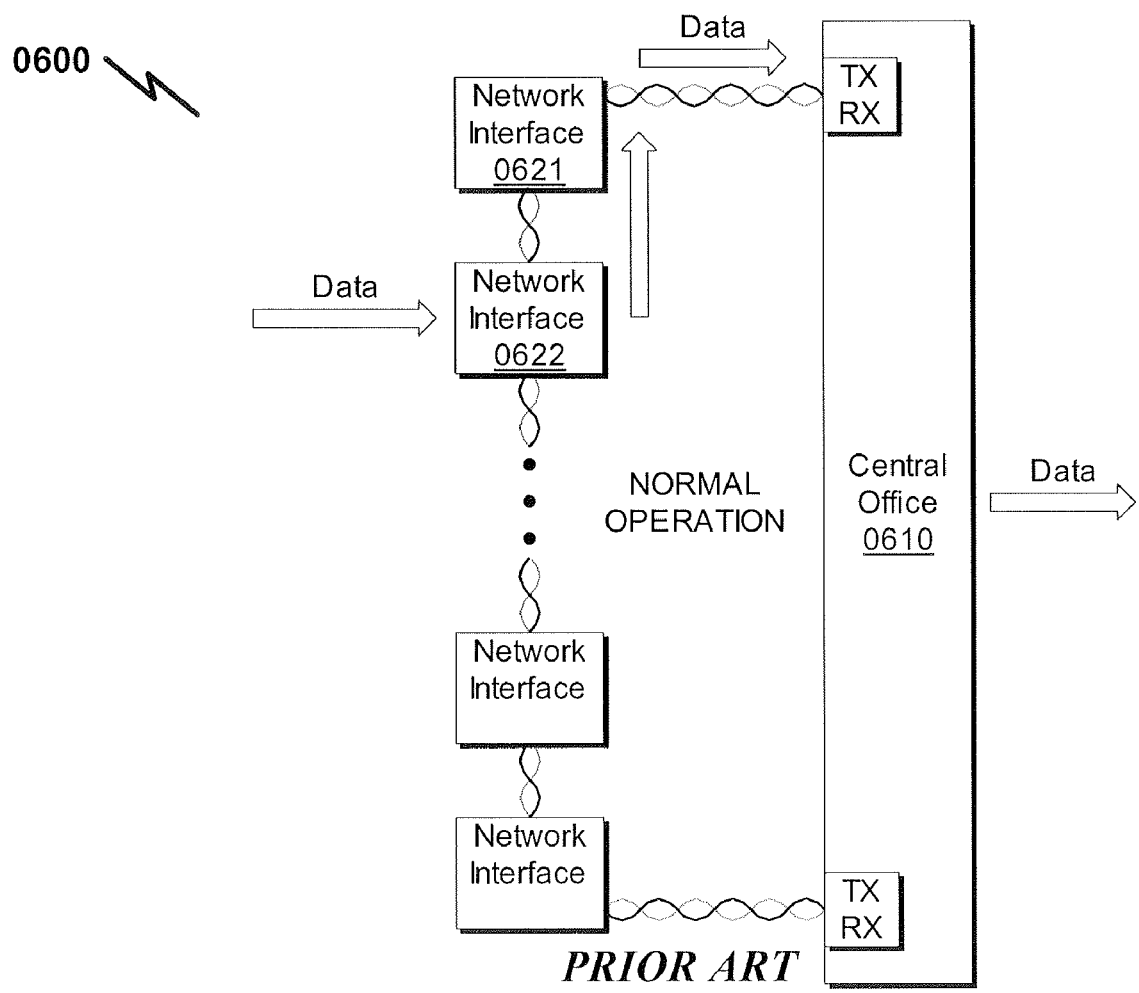
FIG. 6 illustrates prior art path protective switching under normal operating conditions.
Figure 7:
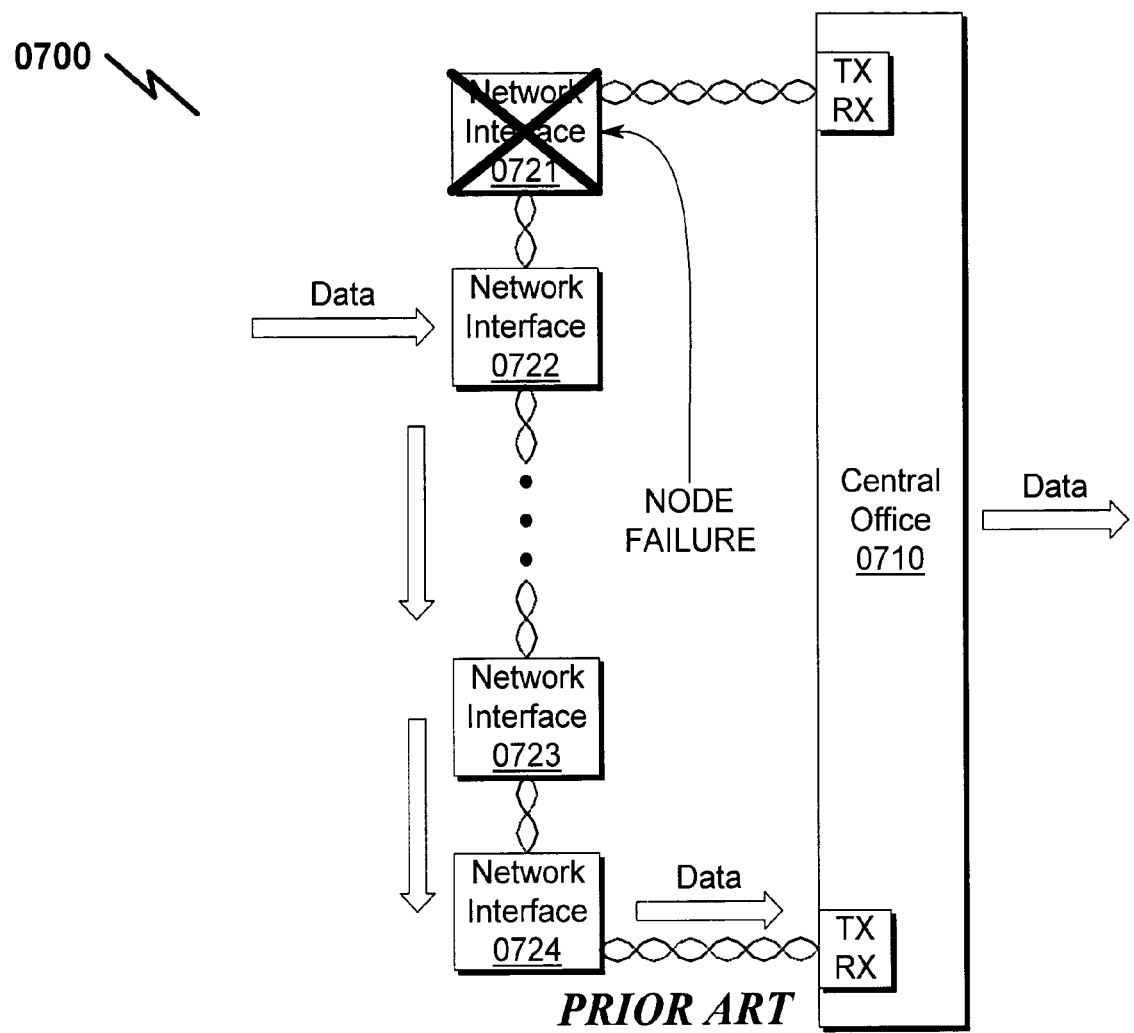
FIG. 7 illustrates prior art path protective switching under node failure operating conditions.
Figure 8:
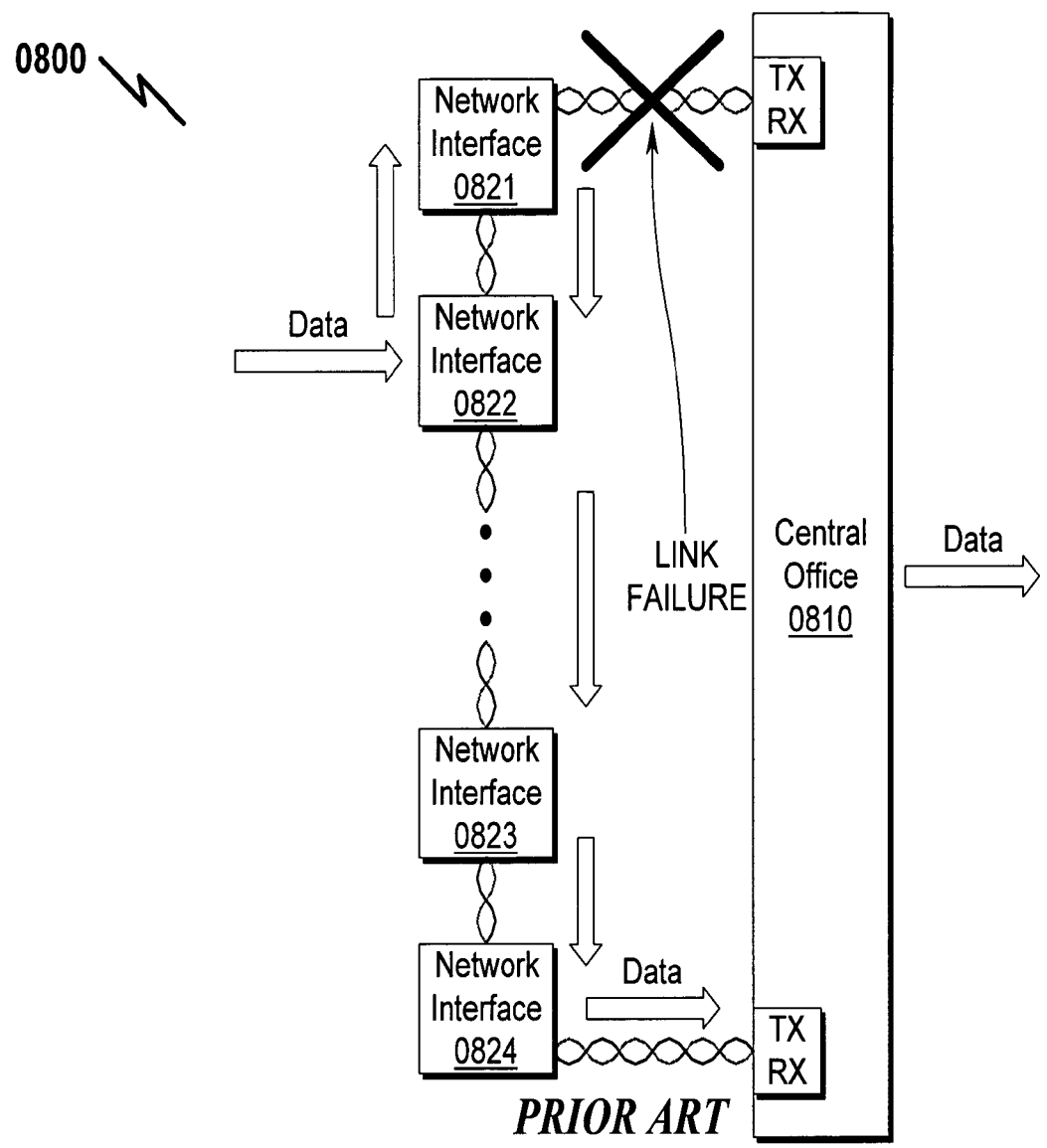
FIG. 8 illustrates prior art path protective switching under link failure operating conditions.
Figure 9:
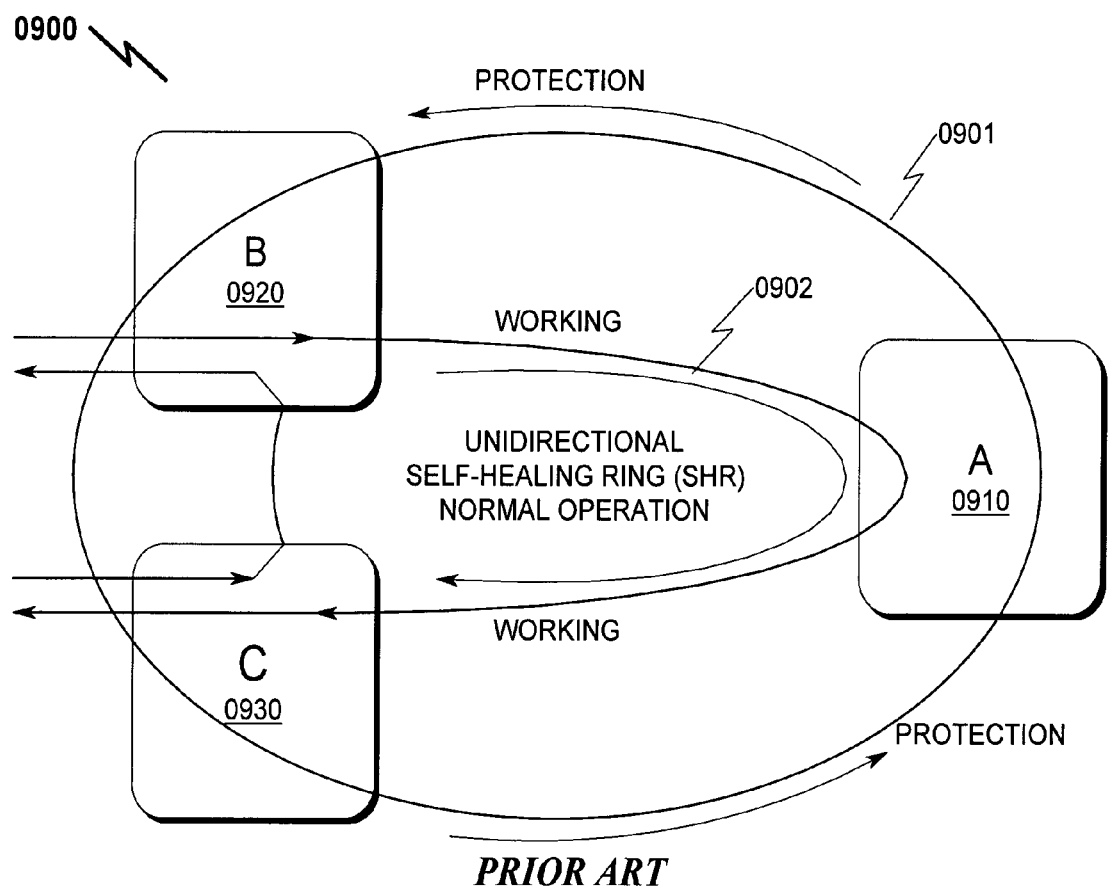
FIG. 9 illustrates prior art path protection ring recovery under normal operating conditions.
Figure 10:
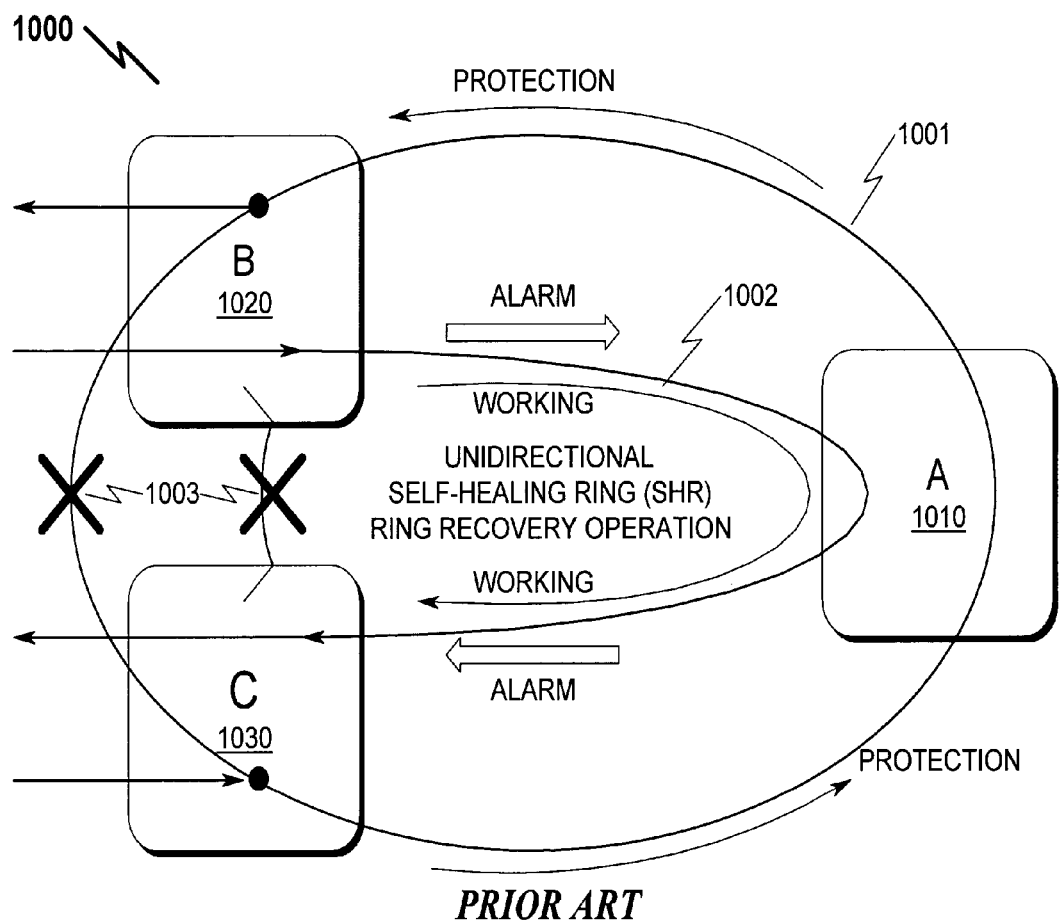
FIG. 10 illustrates prior art path protection ring recovery under link failure operating conditions.
Figure 11:
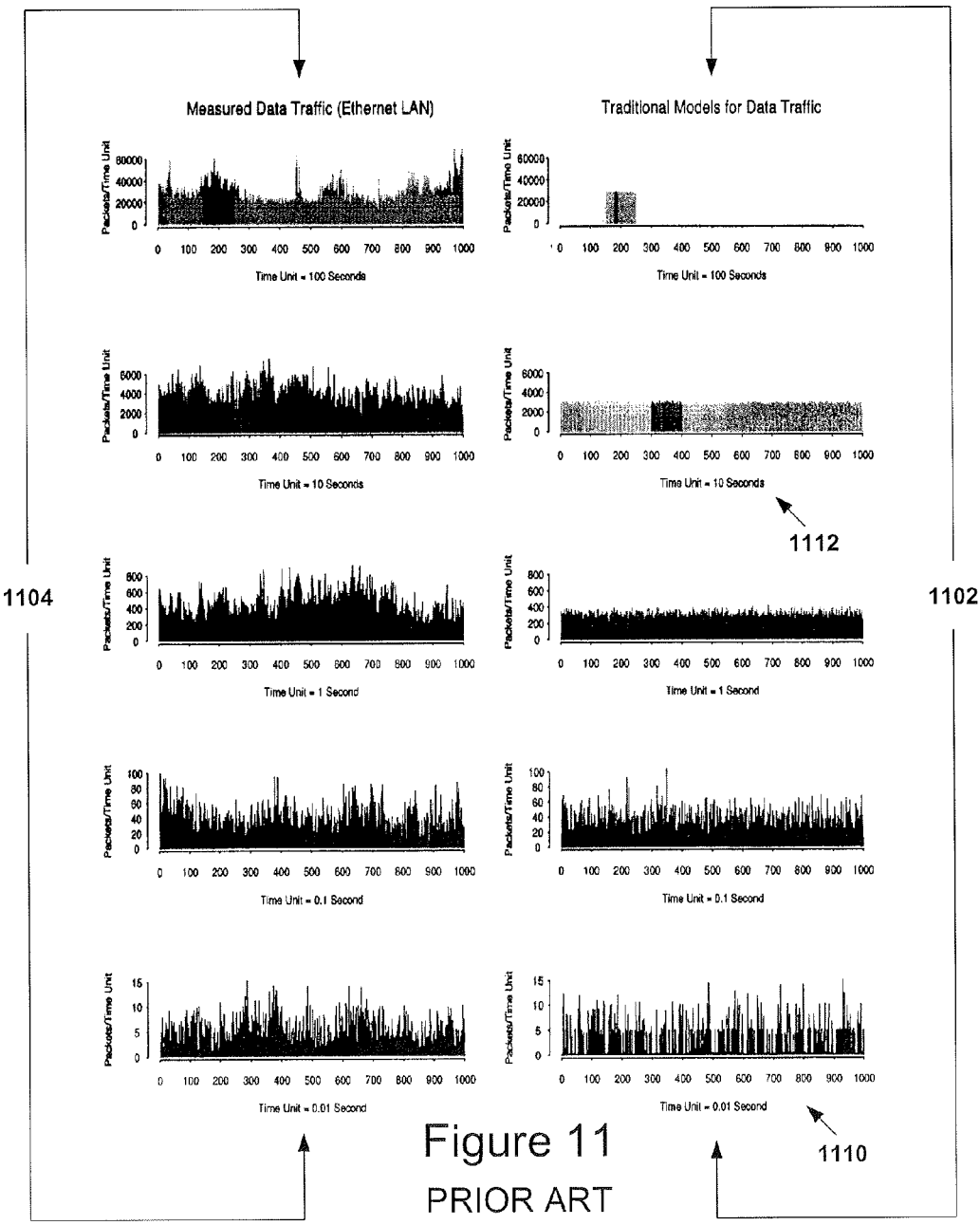
FIG. 11 shows a comparison between bursty data traffic and non-bursty voice traffic.
Figure 12:
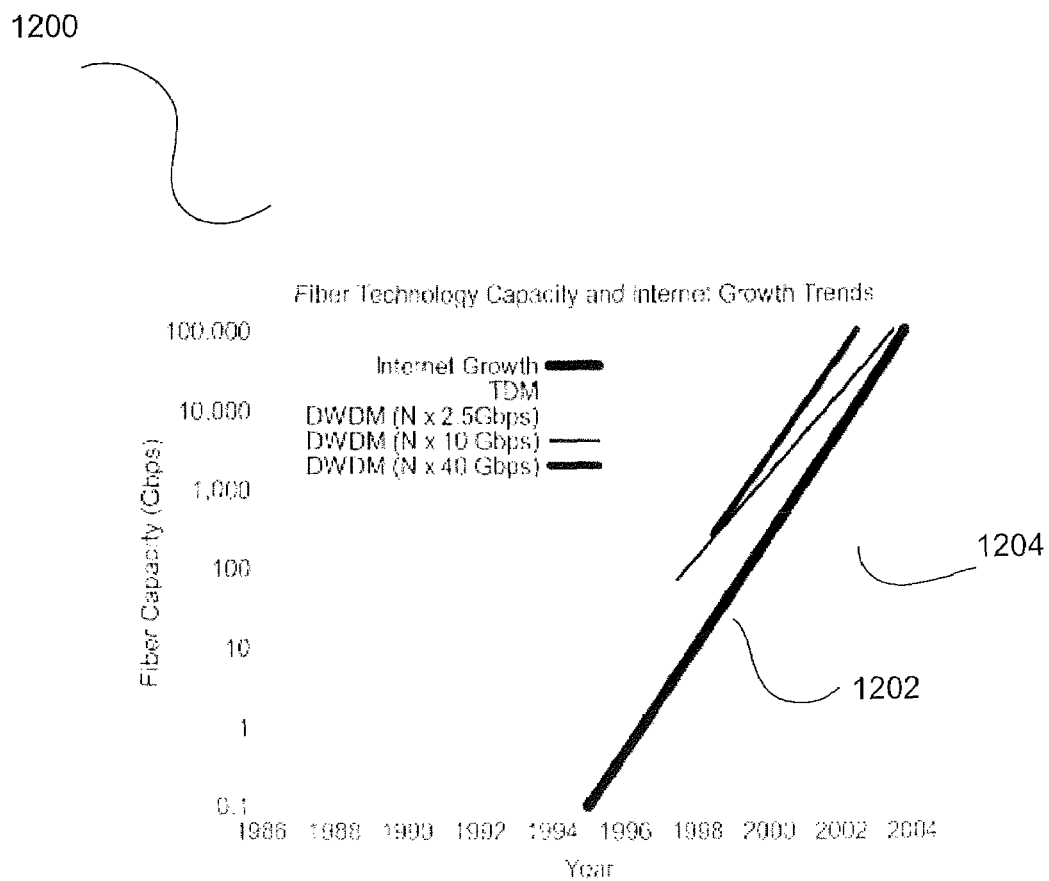
FIG. 12 illustrates current trends in fiber technology capacity and Internet bandwidth growth.
Figure 13:
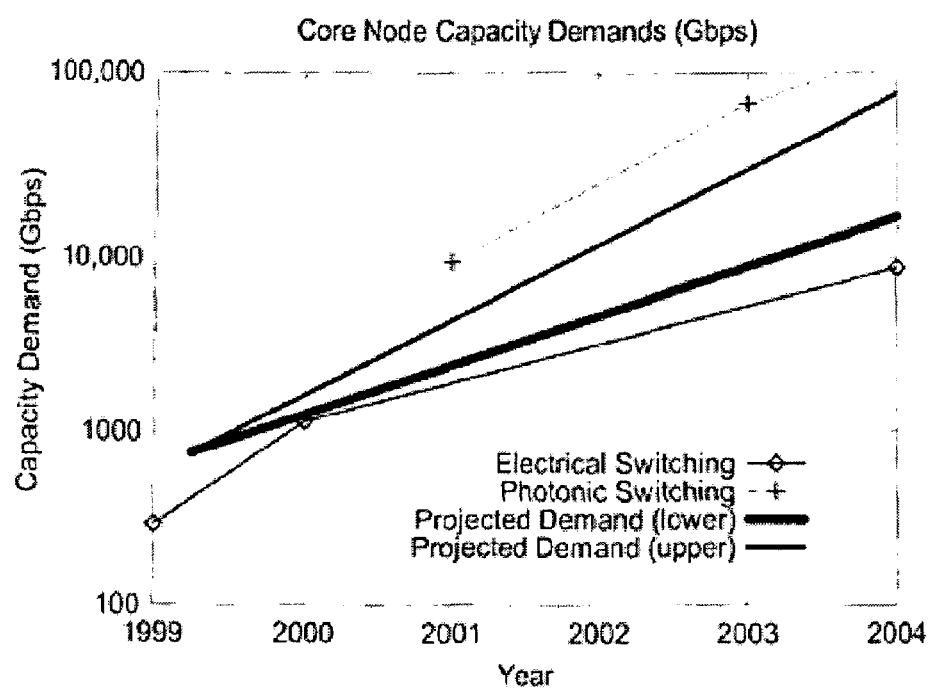
FIG. 13 illustrates current trends in core node bandwidth capacity demands.

The present innovations are described with reference to a "Reference Network," described in another patent application Ser. No. 10/118,084, which is hereby incorporated by reference. The Reference Network is summarized below.

Since the inventions described in this document are intimately related to those presented in the Reference Network disclosure, some discussion of this relationship is in order as a preface. Please note that the Reference Network "token" is redefined (and/or differing fields are used/unused) for many of the schemes here, but the underlying token enhancement (referred to here as the LINK fields of the COMMPATH records, and referred to in the Reference network document as the "Active" fields, and detailed in the Reference Network disclosure) and logical ring architecture appear in all as fundamental ideas and constructions, so these other schemes represent extensions and/or adaptations of that technology. Furthermore, the survivability enhancements embodied in the Reference Network are not compromised by the innovations described here, and the protocols incorporate and integrate these survivability enhancements as well (MESH excluded). The following embodiment is given as an integration of the Reference Network with the inventions of the present disclosure. Again, please note that the integration represents an additional, if unlisted, invention, and that the separate inventions may be easily represented individually, each on a stand-alone basis, or may be present in a system embodiment in any combination.

All dynamic (frequently updated), non-locally shared information is read from and written to the token, and applied on the fly to determine local node actions, yielding online control (via token). All non-local information needing to be dynamically updated is in the token. This simultaneously requires and enables wire speed token processing. Once established, a path endures until either the completion of the burst transmission, or until the expiration of a timer. The desired effect is support for on-demand, real-time establishment and tear down of lightpaths.

Although the major features of the invention listed above are combined into an integrated protocol below, please be aware that not all innovations may be compatible with each other in every useful embodiment. The following sections treat the inventions individually. Please refer to the illustration of the token (extended from the Reference Network embodiment, see FIG. 16) during discussions of token fields.

The integrated protocol embodying both the Reference Network protocols and the protocols for the inventions disclosed here is illustrated here in FIGS. 16-34. Some of the protocol (see FIGS. 20, 21, 22, 23) is unchanged from the Reference Network embodiment, and the structure of the remaining protocol segments has been modified and extended in a straight-forward way. The Reference Network protocol, top-level flow diagram of procedure calling dependencies is given first in FIG. 18 for comparison, followed by the presently disclosed protocol calling dependencies in FIG. 19.

Reference Network

The Reference Network relates to a fully distributed method of dynamically allocating bandwidth between various nodes in a network. Specifically, the method involves the use of a token of information for each available network communication channel ($W_i$, i is one of 0 through (n−1) wherein the token(s) are transmitted over a control communication channel ($W_0$). Each node looks only at the control channel tokens to determine if a data payload is destined for and simultaneously arriving at that node on one of the communication channels. The method and system are particularly useful in allocating bandwidth for "bursty" data traffic.

The Reference Network preferably includes a 1:1, general protection architecture with no central controller, therefore fault tolerance must be fully distributed. If something is wrong with a node or a link, it must be detected and recovery done in a distributed way; and when a failed node/link is ready to come back on line, distributed restoration is required. Three kinds of equipment faults may occur in the network in this system:

a node fails completely, perhaps severing the ring;

a link fails completely, severing the ring; or a node is functioning incorrectly without severing the ring.

The purpose of the Reference Network is to enable protection and restoration of the network in the face of fault conditions such as node or link failures, allowing physical protection and restoration of traffic routes, and in-service reset of network physical topology after repair or replacement of failed nodes or links, also enabling deliberate off line service of network elements and/or insertion or deletion of nodes, with minimal interruption of traffic.

One preferred commercial application for the Reference network is in the construction of optically switched, out-of-band controlled, data communications network elements. Channel reuse makes the token method of out-of-band control practical. A data communications network of such elements holds promise for greatly reduced cost and increased flexibility of data transfer.

Figure 18:
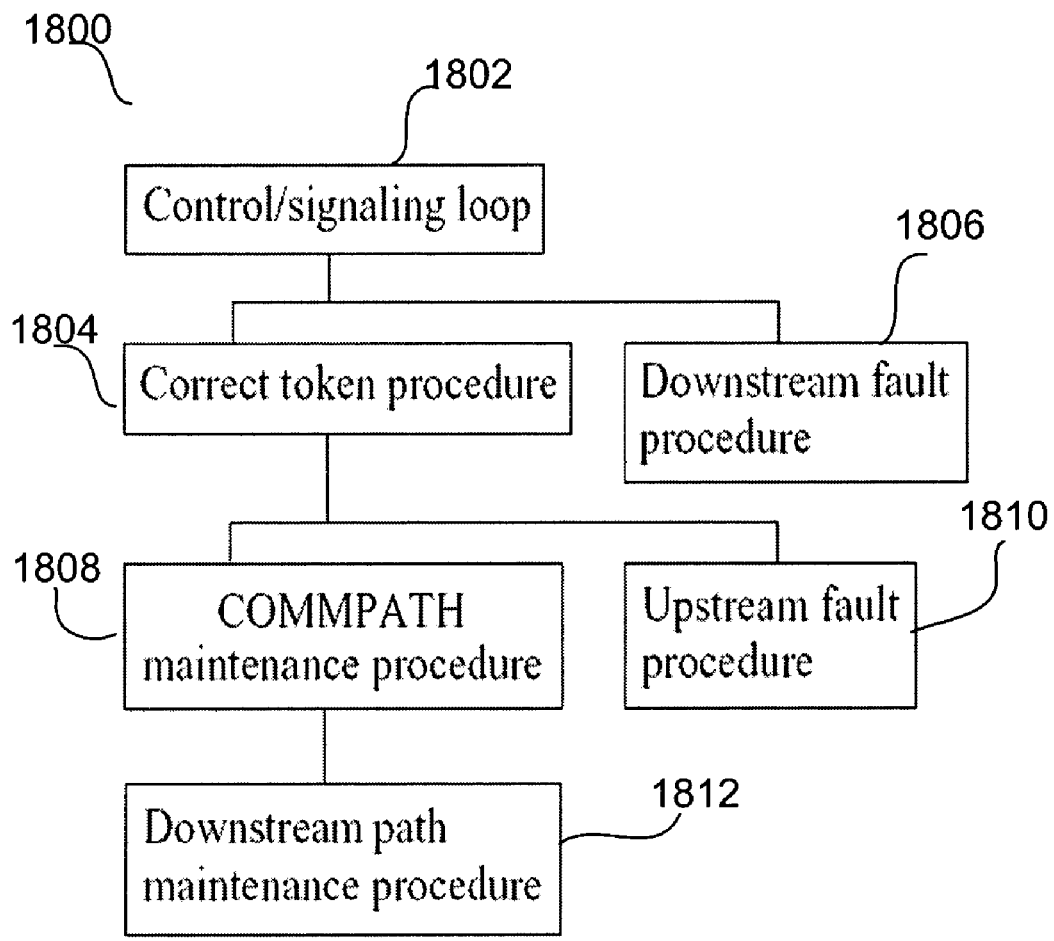
FIG. 18 shows the Reference Network protocol procedure dependencies.

The Reference network protocol procedure dependencies are shown in FIG. 18. These procedures are described more fully in subsequent figures and description, below. The procedure dependencies for the Reference network begin with the Control/Signalling Loop routine (1802), described in FIG. 20. At the next hierarchical level are the Correct Token Procedure (1804) and the Downstream Fault Procedure (1806), described in FIGS. 23 and 21, respectively. At the next level are the COMMPATH (communication path) Maintenance Procedure (1808) (later referred to as the Data Handling Procedure) and the Upstream Fault Procedure (1810), described in FIGS. 24 and 22, respectively. Next is the Downstream Path Maintenance Procedure (1812) (later referred to as the Path Maintenance Procedure), described in FIG. 25.

Figure 20:
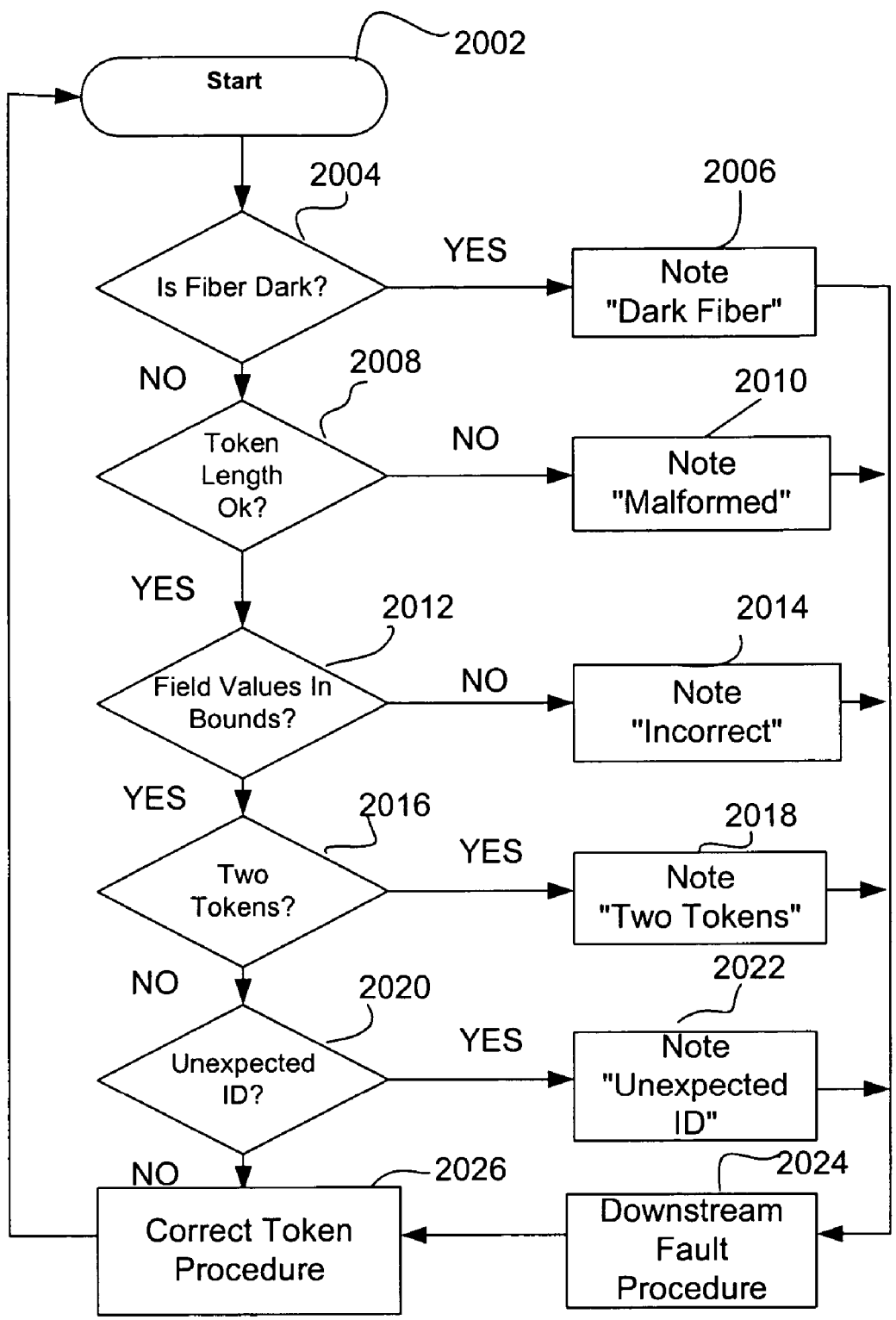
FIG. 20 shows the Control/Signalling Loop Routine.

FIGS. 20 to 25 provide various flowcharts that illustrate the method of operation of the present invention in conjunction with the Reference Network. FIG. 20 illustrates the control and signalling loop routine (2000). The first decision (2104) involves determining whether the fiber is dark (i.e., that there is no signal whatsoever on any channel—optical receivers without filtering are indiscriminate as to wavelength, yielding the requisite "dark fiber sensor"). If yes, then the fact is noted (2006) and the routine proceeds to downstream fault procedures (2024). If the fiber is not dark, then the routine determines if the token is the correct length (2008). If not, then it is noted if the token is malformed (2010) and again the downstream fault procedures (2024) are implemented. Next, the token field values are examined to determine if the field values are within bounds (2012). If not, the fact is noted (2014). If so, then next query is whether there are two tokens (2016) for the same communications channel. If there are, the fact is noted (2018). If not, then the next query is whether there is an unexpected channel ID (2020) in the token. If so, the fact is noted (2022). If not, then the token has been received and is deemed accurate, and the Correct Token procedure is implemented (2026), after which the loop repeats (2002). If any faults are noted during this process, the Downstream Fault procedure (2024) is implemented.

Figure 21:
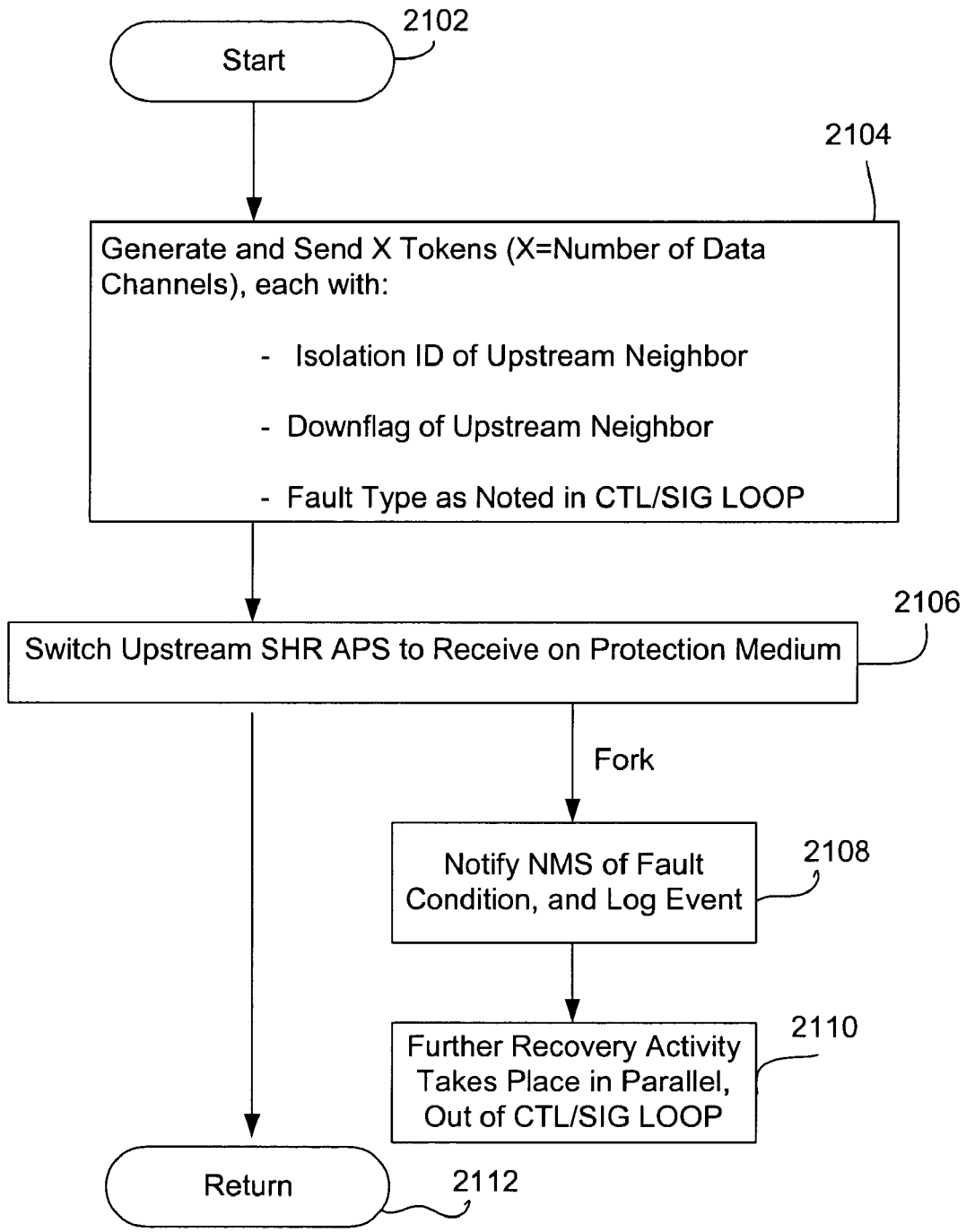
FIG. 21 shows the Downstream Fault Procedure.

FIG. 21 illustrates the downstream fault procedure (2100). The procedure starts (2102) when a fault is detected by a downstream node. The downstream node must generate and send (2104) new tokens to all downstream nodes informing them of the fault. The number of new tokens must equal the number of communication channels. Each new token should mark the isolation ID with a designation for the upstream node and provide a fault type. Next, the first downstream node should also switch (2106) its upstream APS into a bypass mode. At this point, the process forks into two parallel processes. On one fork, the downstream node must notify the NMS of the fault condition and log the information (2108). Next, further recovery activity takes place out of the control/signal loop (2110). In the other parallel process, after the upstream APS is placed into a bypass state (2106), the process returns (2112).

Figure 22:
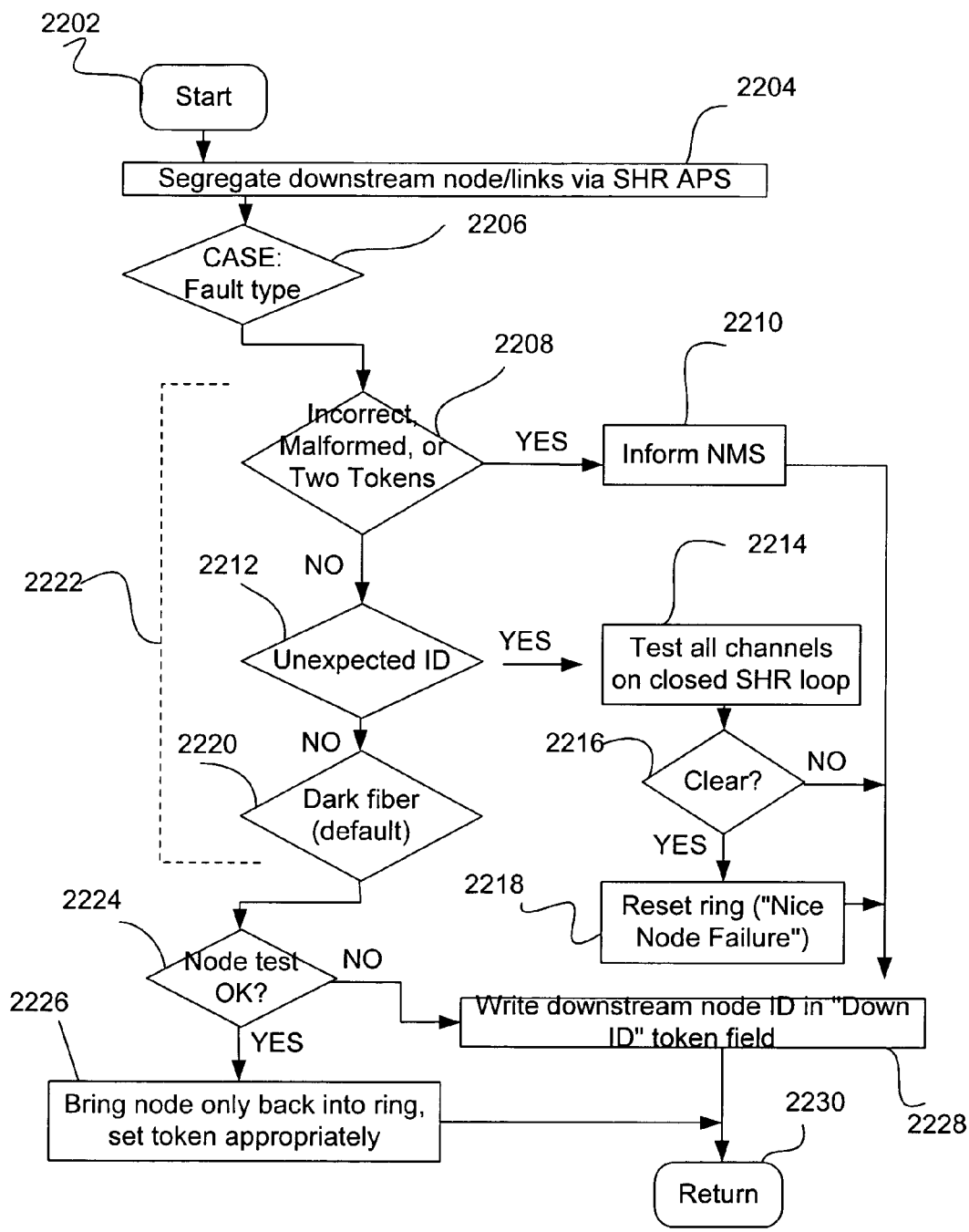
FIG. 22 shows the Upstream Fault Procedure.

FIG. 22 illustrates the upstream fault procedure (2202). It first throws its downstream SHR APS to segregate the downstream nodes and links (2204) and determines a fault type case (2206) as discovered in the control/signaling loop (2000). If the token is incorrect, or if it is malformed, or if two tokens exist (2208), it informs the NMS (2212). If there is an unexpected ID (2218), then the routine tests all channels on the closed SHR loop (2220). If clear (2224), then the ring is reset (2228). This last is the "nice node failure" scenario.

If there are no fault types, or a dark fiber fault is indicated, then the routine proceeds as if there was a dark fiber (2222). This requires that a test sequence be performed with the suspect node (2226). If it is okay (2230), then the node is brought back into the ring and the tokens reset appropriately (2234). If the test sequence reveals that the node is bad, then the routine calls for writing the downstream node ID in the "down ID" token field (2232) and the routine returns (2236).

Figure 23:
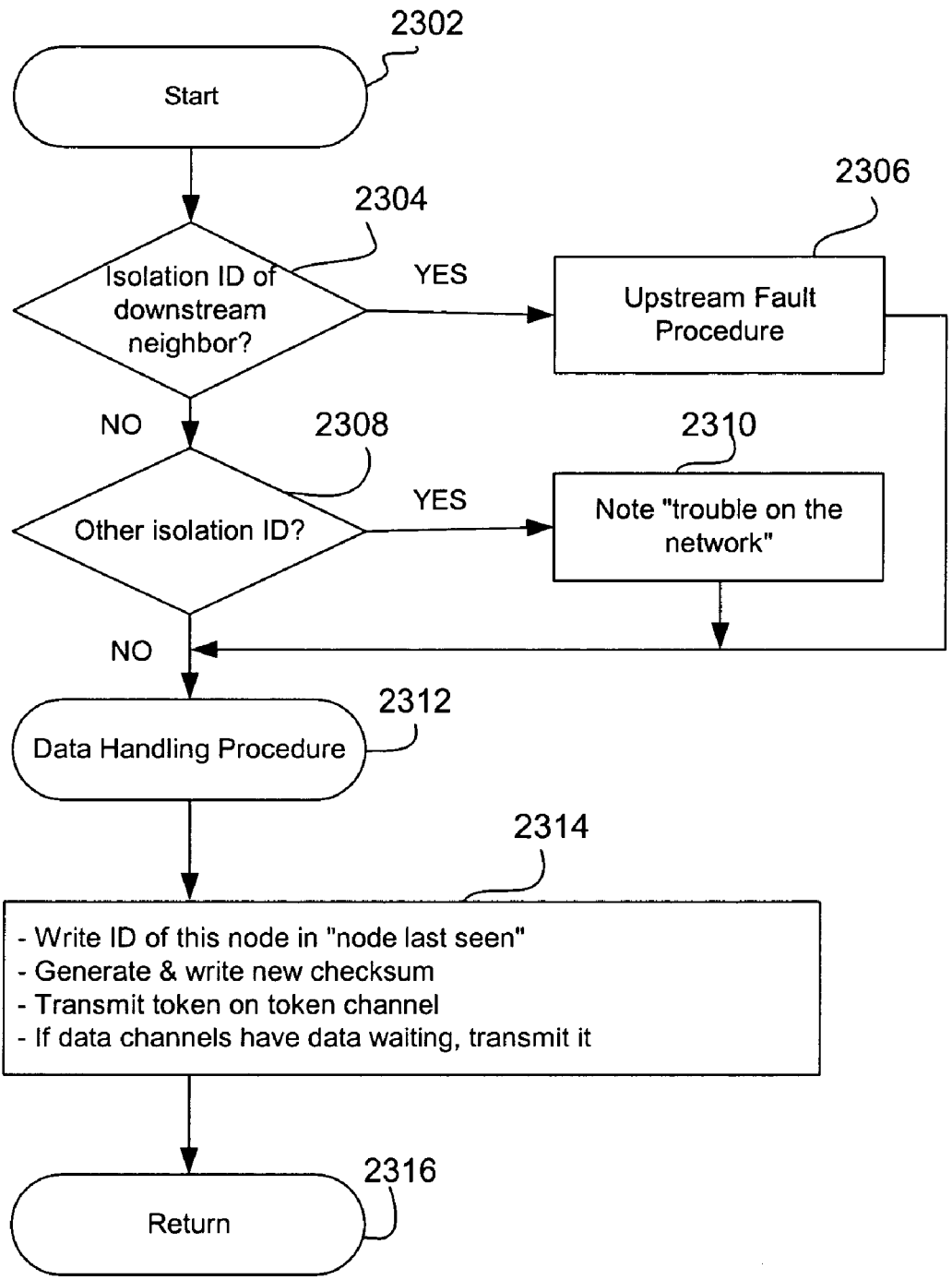
FIG. 23 shows the Correct Token Procedure.

A correct token procedure (2300) is shown in FIG. 23. The procedure starts (2302) by looking for an isolation ID of the downstream neighbor (2304). If it is found, then the upstream fault procedures are implemented (2308). If not, then the routine looks for other isolation IDs (2306). If one is found, then the trouble on the network is noted (2310), in order to avoid sending data to suspect nodes. In any event, the routine continues to the Data Handling procedure (referred to in the Reference Network application as the COMMPATH Maintenance Procedure) (2312). Next, the routine writes its own node ID number in the node last seen field in the token. The routine also generates and writes a new checksum. Next, the new token is transmitted on the control channel. If the data channel has data waiting, it is transmitted (2314). Finally, the routine returns (2316) to the control/signaling loop (2000).

Figure 24:
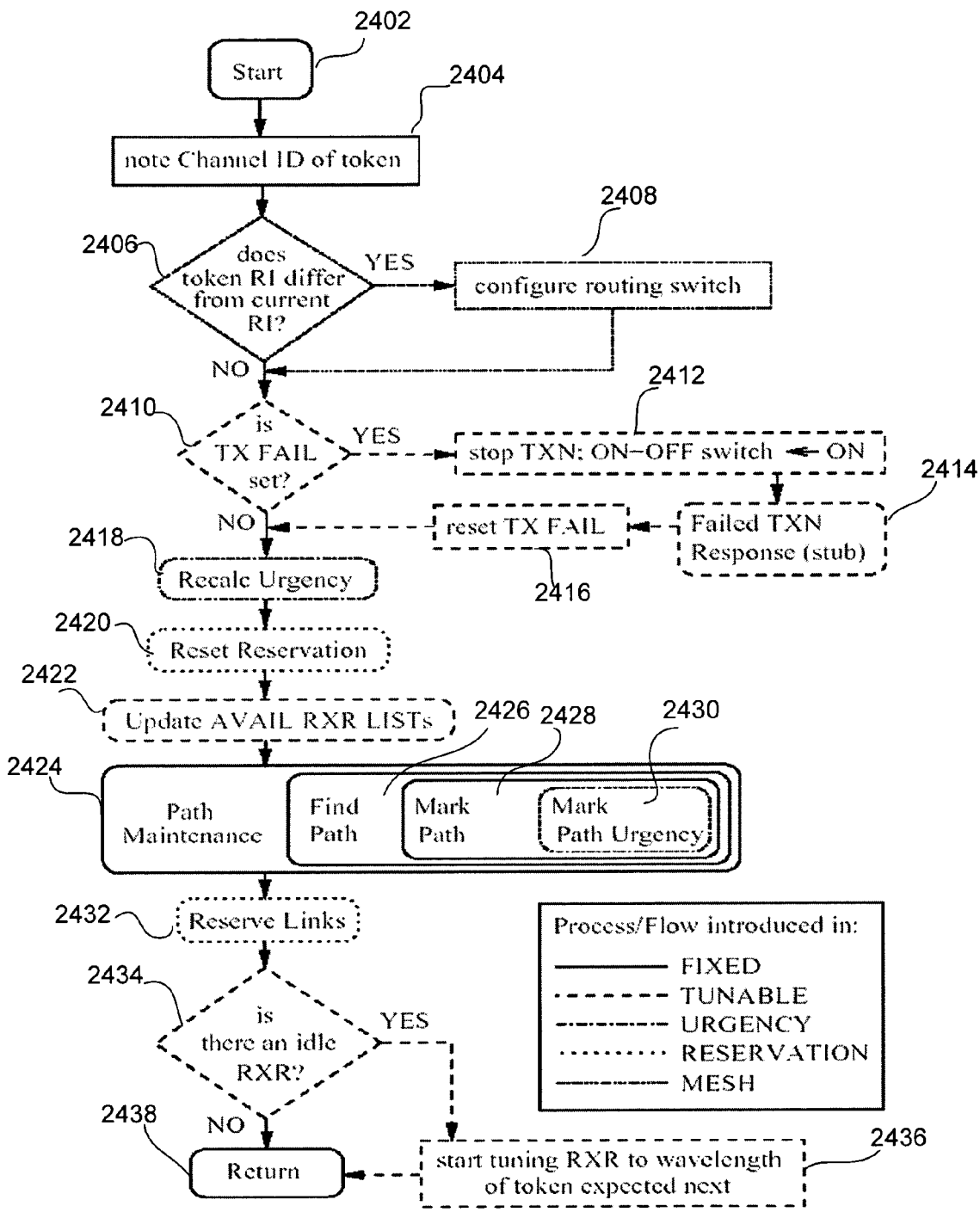
FIG. 24 shows the Data Handling Procedure.
Figure 25:
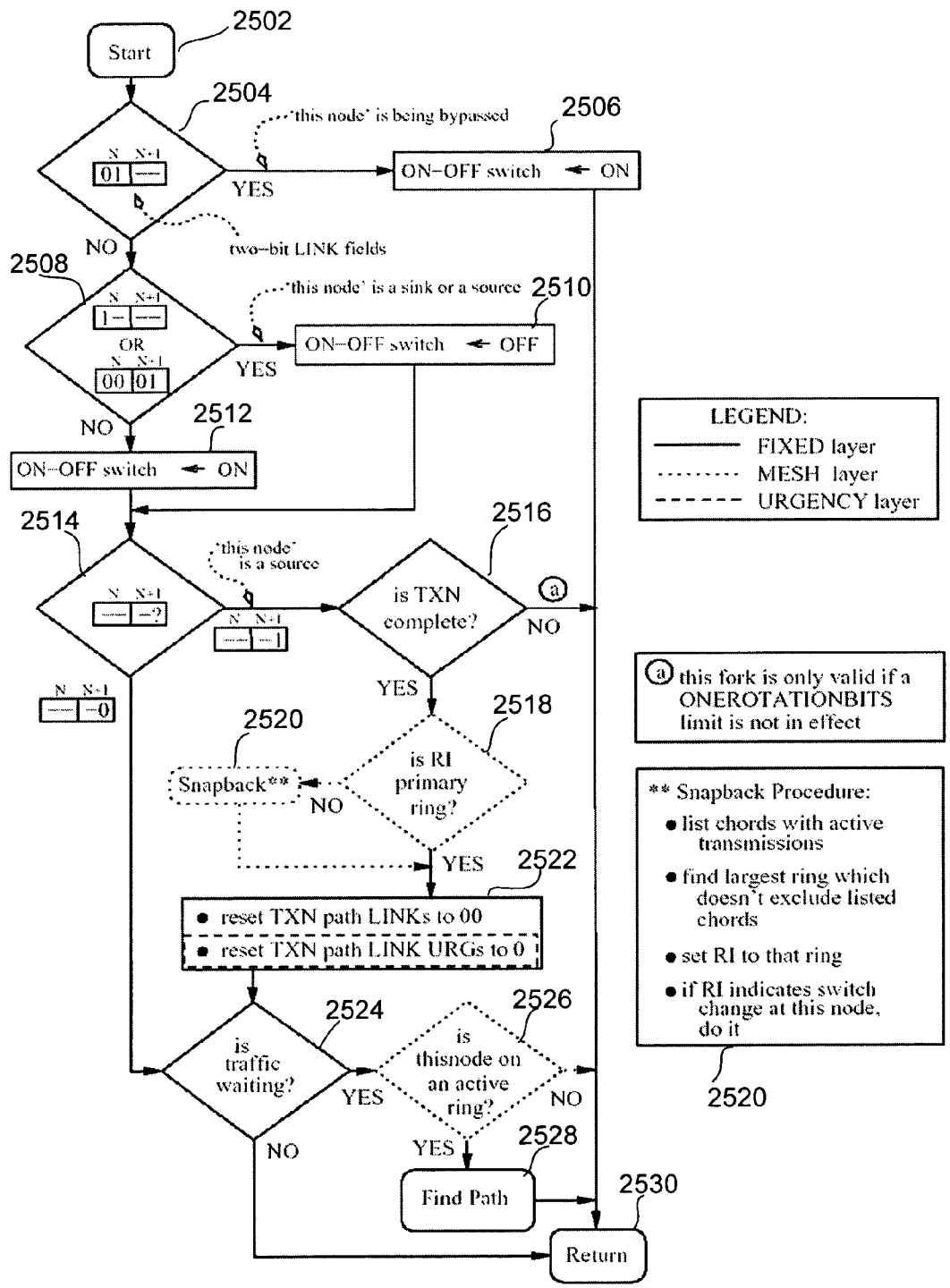
FIG. 25 shows the Path Maintenance Procedure.
Figure 26:
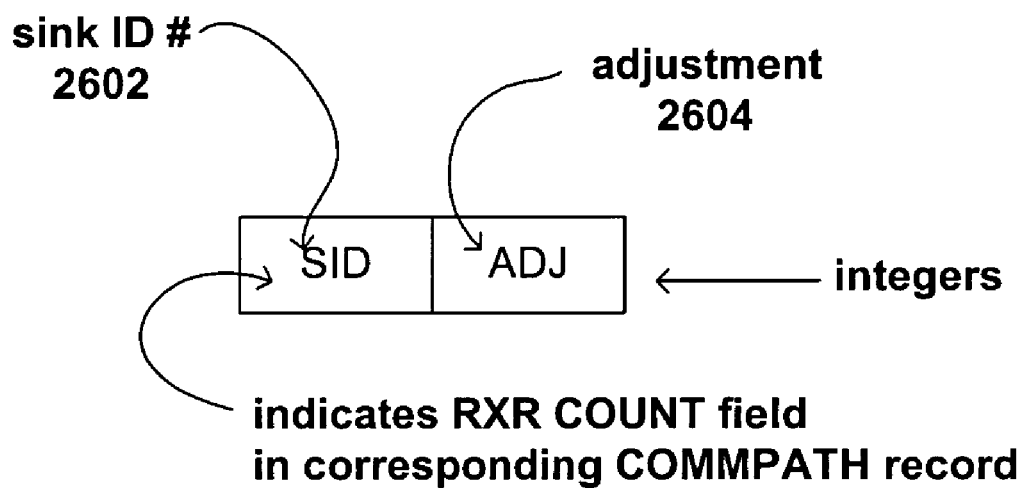
FIG. 26 shows the Receiver Count List record fields.

FIG. 24 shows the Data Handling (referred to in the Reference network disclosure as "COMMPATH maintenance" (1808)) procedure (1910). FIG. 25 shows the Path Maintenance Procedure (referred to in the Reference Network disclosure as the Downstream Path Maintenance (1812)) Procedure (1918). Referring to FIGS. 24 and 25, for the present disclosure, some functionality has been shifted between the two procedures, in order to more conveniently represent the flow of the control processes in this expanded context, and some functionality has been added to represent newly disclosed inventive work in this expanded context, resulting in an altered form. At this point, in order to avoid confusion, we avoid reproducing the remaining portions of the protocols as they were presented in the Reference Network disclosure, since all of that material is reproduced below in the above-mentioned altered form, henceforth referred to as the "Inner Network/Inner Protocol" for this disclosure. All of the functionality and structure of the MESH inventive work, here classified as part of the Outer network, was disclosed in the earlier Reference network disclosure; and is presented separately following the sections on the Inner network, with detailed explanation of the integration of the Inner Network and the MESH invention.

The Extension of the Reference Network to the Present Inventive Work

Figure 19:
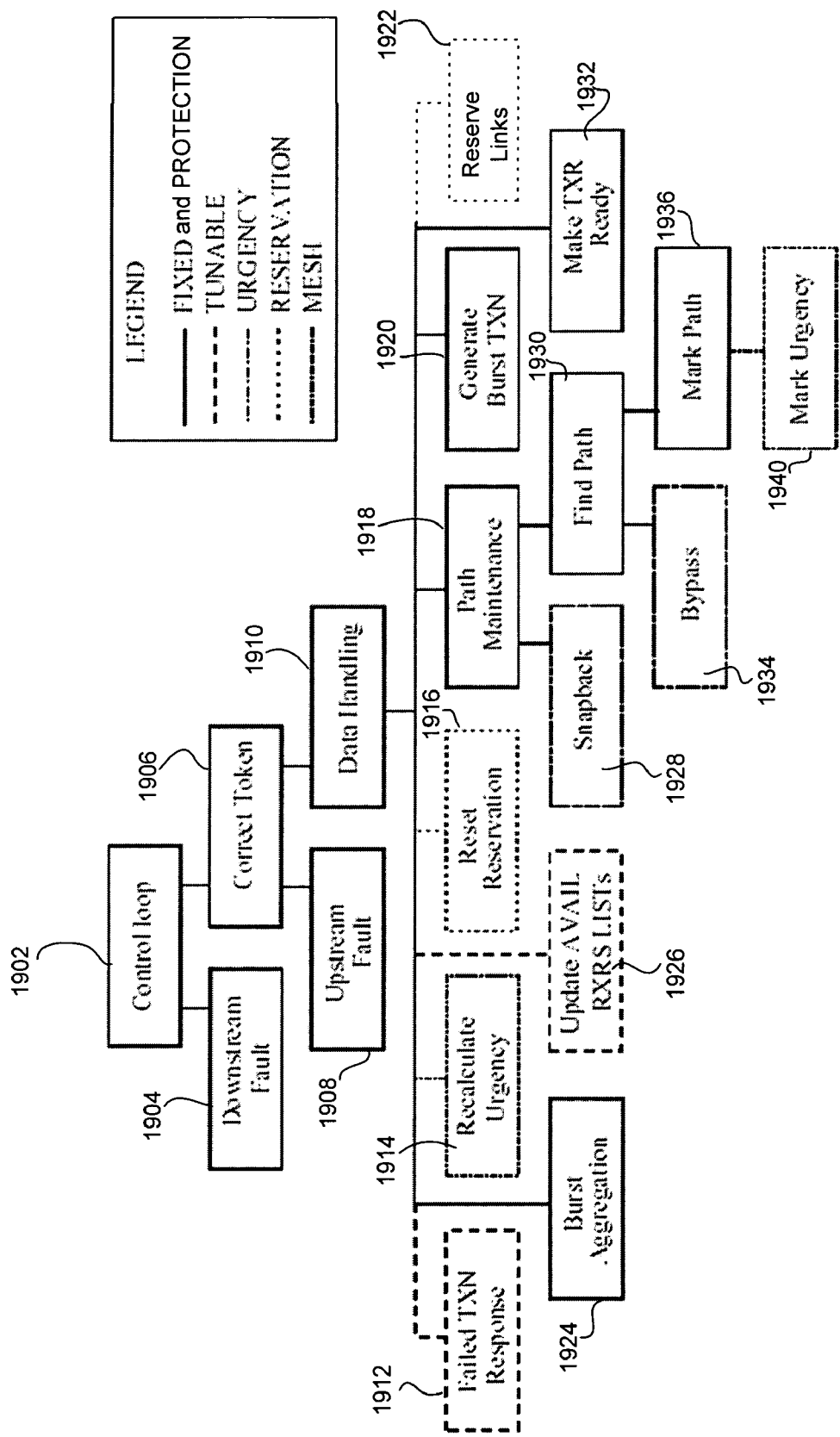
FIG. 19 illustrates the extended protocol procedures consistent with a preferred embodiment.

FIG. 19 depicts the extended procedure dependencies, and adds to and builds on the Reference Network procedure dependencies of FIG. 18. The Extended protocol procedure dependencies add an Update AVAIL RXR LISTs, shown in FIGS. 26 and 27; Find Path procedure, described in FIGS. 28 and 31, the Snapback procedure (1928 and 2520); Failed TX Response (1912 and 2414); Reserve Links procedure, described at FIG. 29; Mark Path procedure, described at FIG. 30, (2428), and (2414); Recalc Urgency, described at (2418) and in the text; and Reset Reservation, described at (2420) and in the text.

Figure 14:
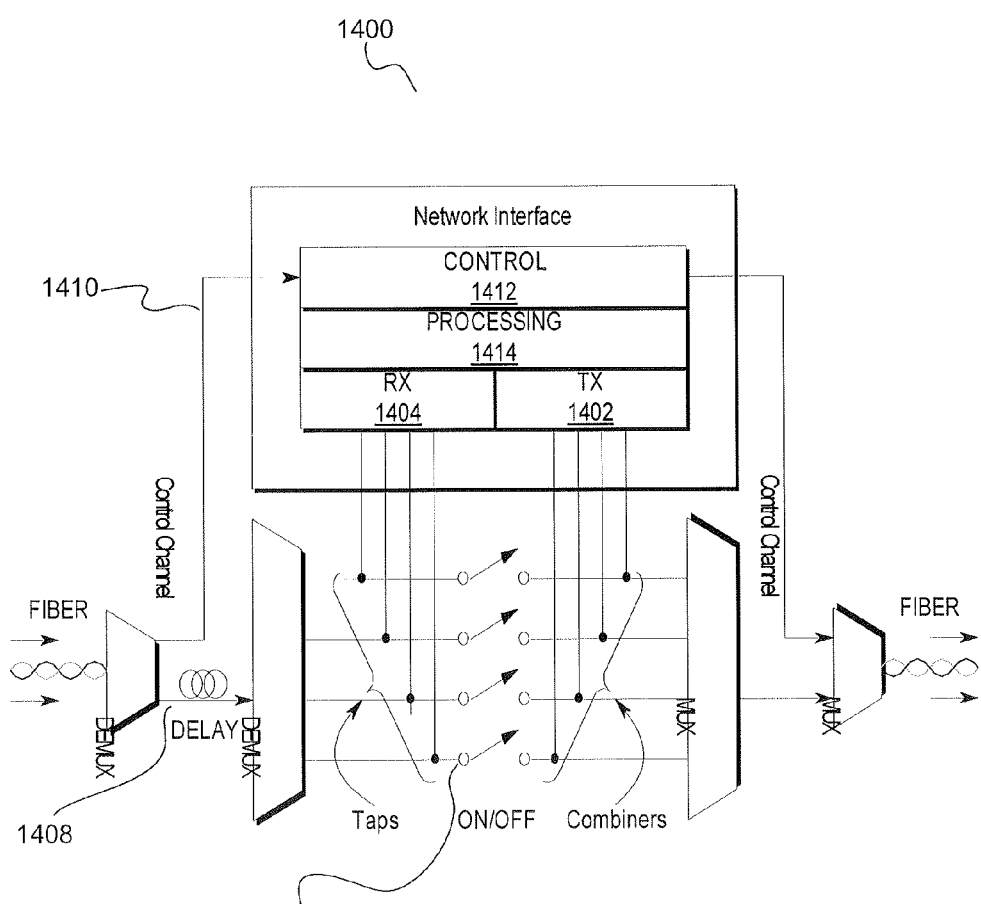
FIG. 14 illustrates a prior art WDM signaling and control system.
Figure 15:
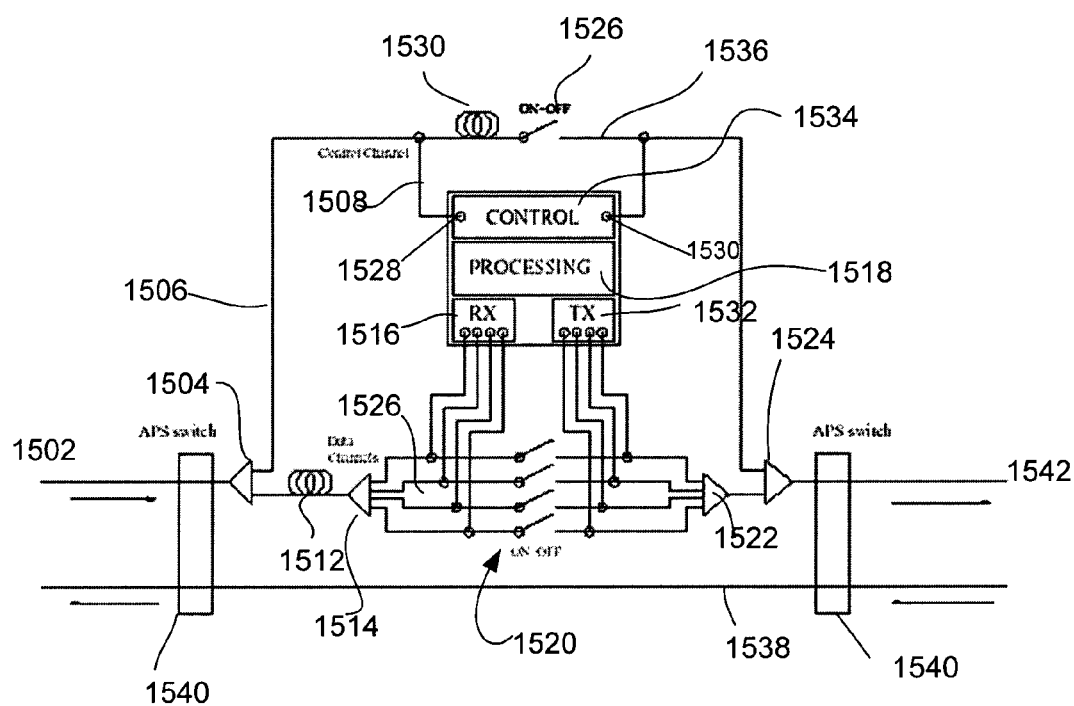
FIG. 15 shows the Reference Network Node consistent with the implementation of a preferred embodiment.

FIG. 15 illustrates a node consistent with the Reference network. It is similar to the node shown in FIG. 14 with the exception of the control channel bypass. The fiber (1502) carrying both the control channel and the other communication channels is initially demultiplexed to separate the control channel (1506). The control channel is tapped (1508) prior to the delay loop (1510). In other words, the control channel is processed while the communication channels are in their own delay loop (1512). Four communication channels are shown. In one embodiment, all of the channels are demultiplexed (1514). Each channel is also tapped into a receiver (1516) in the node. If the control channel token indicates that a payload is located on one of those tapped communications channels, then the receiver will pass the payload on for processing (1518). Further, the switch (1520) for that channel can be opened to clear the data payload from that channel. The data on the communication channels is then remultiplexed (1522). Further, the control channel is remultiplexed (1524) with the communication channels.

The switch (1526) allows the control channel tokens to be remultiplexed into the data stream unaltered. If a node (1500) fails and cannot rewrite a token, then the switch (1526) remains closed, its default position, and the token as received from upstream is allowed to pass. If the node is operating properly, then the token can be rewritten as needed and the switch (1526) is opened to clean the upstream token from the control channel. Thus, the token as received is cancelled and the newly rewritten token is remultiplexed into the data stream.

The node of FIG. 15 can be equipped with automatic protection switching (APS) (1540) to form a "greater" node. This includes opto-electronic switches, assemblies that allow normal (working) traffic flow in a clockwise direction, and shunt traffic onto and off of an auxiliary (protection) counterclockwise fiber ring, (1538) under loss of signal on the working fiber. The fault can be in either a node or a fiber. In either case, it is important that a system be in place that allows the fault to be quickly isolated, tested, and a working data transfer solution be implemented.

Each of the inventive aspects disclosed herein are described with respect to the Reference network.

Figure 33:
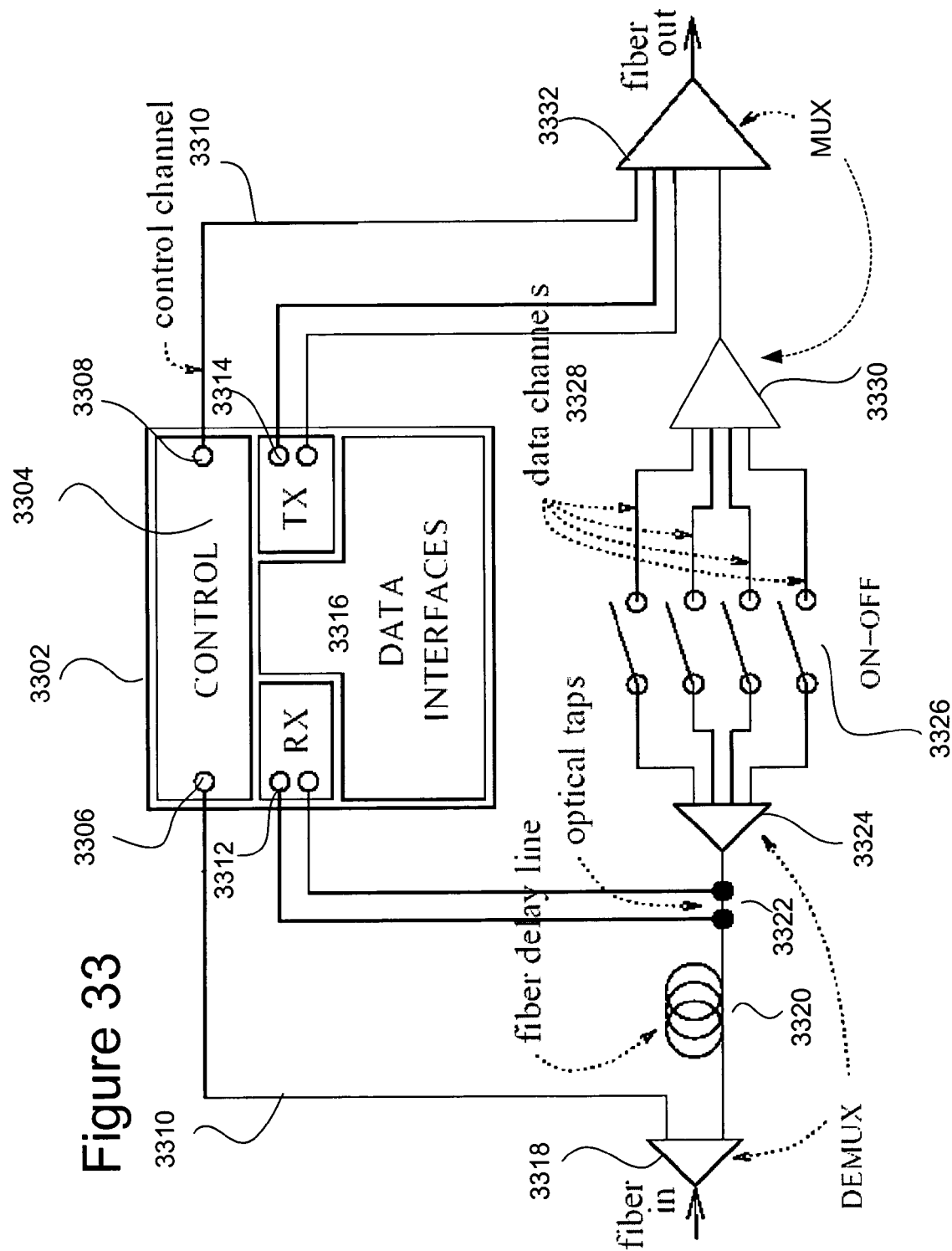
FIG. 33 shows a low-power node, exclusive of protection hardware, consistent with the implementation of a preferred embodiment.

The transmitter/receiver restricted network (also referred to as TUNABLE and TANDEM) concept differs from prior art by describing a method to allow the Reference Network (the portion of which resides in the inner network is also referred to as FIXED) to function in a situation where the number of transmitters and/or receivers per node is less than the number of wavelengths available; and by allowing the Reference Network to function in a situation where receivers and/or transmitters are constrained to operation on a limited waveband. A node consistent with the transmitter/receiver restricted network is shown in FIG. 33 (APS switches, control bypass, and protection fiber not shown).

The quality of service (QoS) idea differs from prior art by describing a method (also referred to as URGENCY and RESERVATION) to allow the Reference Network to maintain fairness and avoid starvation.

Figure 34:
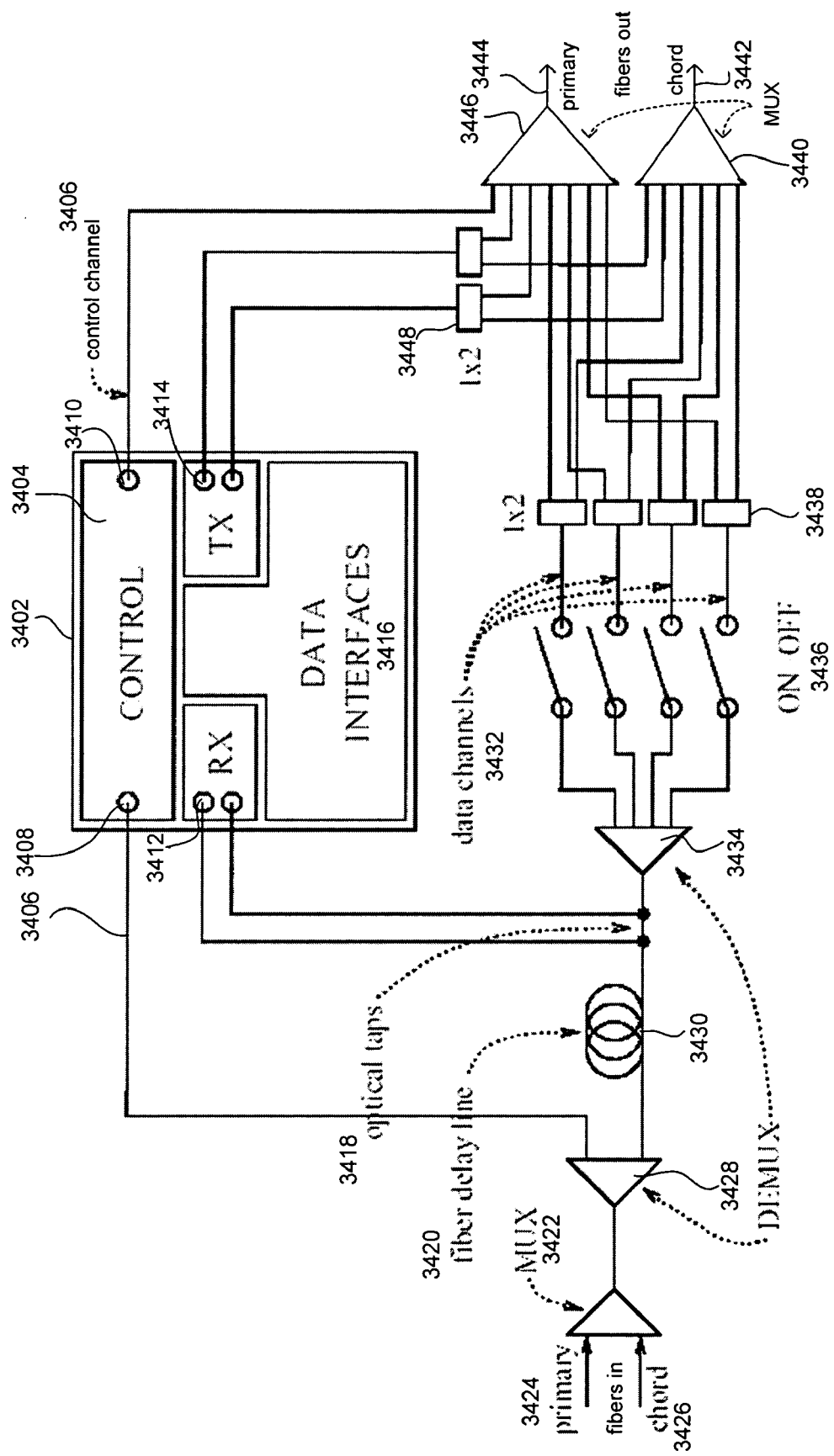
FIG. 34 shows a low-power node, in a MESH architecture, consistent with the implementation of a preferred embodiment.

The mesh concept (also referred to as MESH) differs from prior art by describing a method to allow the Reference Network to function in a network topology more connected than a ring. Such a method may be used to balance loads, to enhance survivability, to extend QoS functionality, to allow traffic to bypass congestion, to enable dynamic traffic engineering, and/or to support bandwidth management. A node consistent with the transmitter/receiver restricted network is shown in FIG. 34 (APS switches, control bypass, and protection fiber not shown).

The Inner Network: Protocol and Structure

In describing the inner network, we will restrict our discussion to a simplified set of features. With respect to the calling dependencies (FIG. 19), we will not consider the Control Loop (1902, FIG. 20), Downstream Fault (1904, FIG. 21), Correct Token (1906, FIG. 23), or Upstream Fault (1908, FIG. 22) routines, since they have only to do with the protection functionality of the outer network. The discussion will be as if the Data Handling Procedure (1910, FIG. 24) is the outer loop, with Return (2438) returning to Start (2402), and that the token and data transmission tasks (see FIG. 23, 2314) appear in Data Handling immediately prior to Return (2438).

To simplify the discussion, we present one layer at a time, building the full functionality as we go. Therefore, the description of each layer will ignore aspects of the system that are used only in higher layers. Figures should be interpreted in this light, i.e., some features that only pertain to higher layers (or to Protection, or to MESH systems, and/or to various aspects of the Reference network) may appear, but not be discussed, in illustrations referenced with respect to lower layers. The Outer network MESH functionality is not considered until after the description of the Inner network is complete.

FIXED

The FIXED layer, the underlying functionality of the inventive work described herein, is described in this section.

FIXED Architecture

FIXED is closely based on ideas given in Fumagalli et al. (see discussion above). The FIXED system (see FIG. 15) may have N nodes, each comprising: W data channels (1526); W optical on-off switches (1520); and one control channel (1506, 1536). Each node may have (W+1) transmitter/receiver pairs (1516, 1532, 1528, 1530) which are the node's interfaces to the optical fiber, each pair fixed to a different channel tuning. The control channel is split off prior to the FDL (1512). There may be W multi-byte tokens (FIG. 16) traveling around the network in the control channel (1506) at approximately equal spacing. We assume approximately equal inter-arrival times of tokens in their collective rotation. Token processing plus on-off switching delay is assumed to be less than the FDL delay. The data channels (1526) may enter the FDL, and then may be demultiplexed (1514) to a parallel array of W on-off switches (1520), and subsequently remultiplexed (1522, 1524), together with the control channel, to downstream media (1542). As in prior art, the on-off switches control the flow of signals through the node, and may be used to prevent bursts from circulating in the ring; the FDL delay may be chosen so that token processing time plus on-off switching delay is less than the FDL delay.

Each node may maintain N−1 queues of data destined for the other nodes, as well as maintain buffers for data about to exit the network, in a data processing sub-system (1518). Within each queue, data may be discretized into bursts. (We will refer to all transmissions as "bursts.") A burst of data may be limited in size to that which can be transmitted during one rotation of the token controlling its channel. We refer to this time as ONEROTATION, and to the amount of data which can be sent in this time as ONEROTATIONBITS. We can view a discrete grouping of bits from a single source to a single destination as a packet train. In a given queue, each burst in turn is aggregated using a first come, first served discipline; if an arriving packet train would cause a burst to overflow, the burst is marked full, and a new burst is started.

In FIG. 15, considering at this time only the Inner network/protocol, we will ignore the counter-rotating fiber (1538), the automatic protection switches (APS) (1540), the control channel bypass (1536) and on-off switch (1526). Also recall that, for the discussion of the Inner network, we are viewing the Data Handling Procedure (1910, and FIG. 24) as a control loop, with token and data transmission occurring immediately prior to Return (2438).

FIXED Protocol

For each data channel, one token circulates in the control channel. A token (see FIG. 16) may comprise a channel identifier (1602) and N COMMPATH records (1604), each record consisting of one LINK field (1606). For record i, the LINK field carries the status of the link immediately upstream from node i, either FREE, denoted "00";

SOURCE, denoted "01", representing either:

(a) a source link, i.e., a link immediately downstream from a source node, or (b) an intermediate link;

SINK, denoted "10", a terminating link; or

ONE_HOP, denoted "11", a one-hop path.

With respect to SOURCE links, in other words, the "01" value may denote one of two meanings, depending on context, as follows. In a graph, where an n node, unidirectional ring may represent a FIXED or low-power network, ean deach directed arc may represent a LINK field, a path of k consecutive "01" values may be interpreted thus: the first "01" arc is emitted by the source of the burst. The remaining (k−1) values represent path links not contiguous with source or destination nodes. (See APPENDIX I for further discussion.)

Thus, a three-hop path would have a token representation of "01 01 10", and a one-hop path of "11". Contiguous paths can thus be distinguished from the token alone. Such is not the case with prior art, which utilizes a bit mask of one bit (binary representation) LINK fields, either free or taken.)

The heart of the protocol is Path Maintenance (see FIG. 25). (Only solid-line portions of the figure are relevant to FIXED. Portions of a figure that are specific to a scheme are so indicated. Schemes introduced later will use all portions of earlier, i.e., lower, schemes unless specifically indicated otherwise.) Upon receiving token $t_j$ (for channel j), node $n_i$ may examine $t_j[i]$.LINK (2504). If $t_j[i]$.LINK is SOURCE, a through transmission is in progress, so $n_i$ turns on on-off switch j (2506); and $n_i$ is done.

Otherwise (2508), if $n_i$ is a sink (i.e., $t_j[i]$.LINK is either SINK or ONE_HOP), on-off switch j may be turned off (2506) to protect downstream nodes from the burst. A ONEROTATIONBITS burst size constraint may be in effect. If so, any burst initiated at the previous visit of token j will now be completed. If $n_i$ was a source (2514) on the last round ($t_j[i+1]$.LINK is SOURCE or ONE_HOP), and if its own transmission is complete (2516), it may FREE its path (2522). (Again, this invariably occurs if a ONEROTATIONBITS burst size limit is in effect.) If there is a burst waiting (2524), $n_i$ may attempt to find a path (2528), scanning the token to find the longest FREE downstream path for which a burst is waiting (Find Path (1930), FIG. 28). Marking a path is done as described above (LINK discussion). The token may now be retransmitted; and the burst, if there is one, may be transmitted simultaneously. In the Outer protocol, this token and burst transmission appear in FIG. 23 (2314). For this Inner protocol discussion, consider the token and burst transmission to appear in Data Handling (FIG. 24) immediately prior to Return (2438).

TUNABLE and TANDEM

TUNABLE

In this section, we begin to develop the low-power network.

In TUNABLE, data transmission media interfaces with tunable transmitters and receivers may allow system use of a full range of channels, requiring as few as one data interface per node. The low-power node (exclusive of outer network hardware) is shown in FIG. 33. Note that the optical taps (3322) are positioned upstream of the demultiplexer (3324) that splits off the individual data channels (3328), so that each receiver (3312) can tune to any of the data channels.

Figure 16:
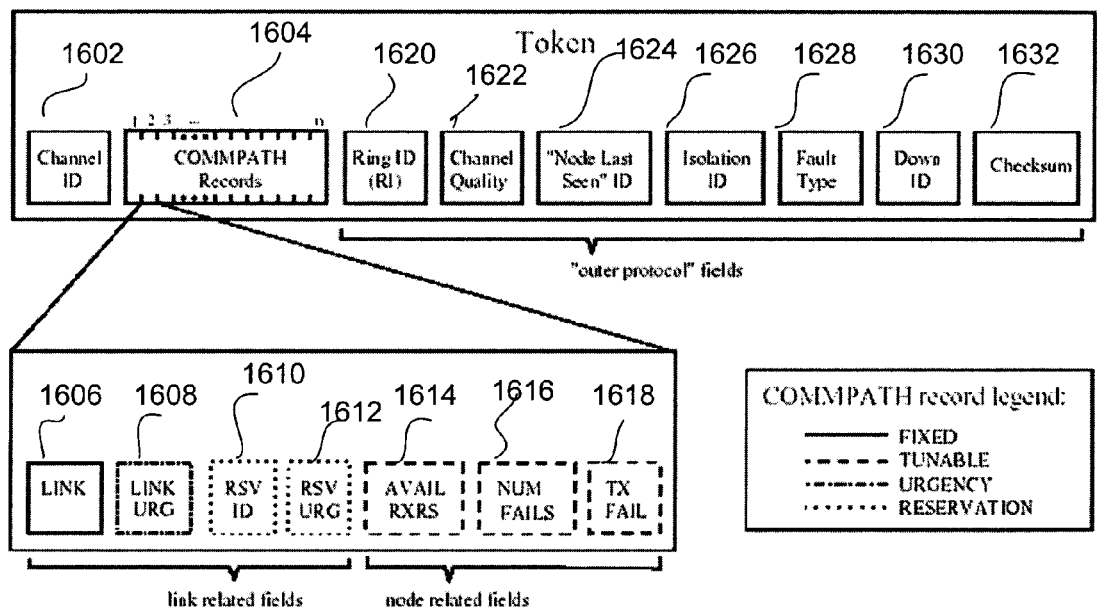
FIG. 16 shows a diagram of the fields in a token consistent with a preferred embodiment.
Figure 17:
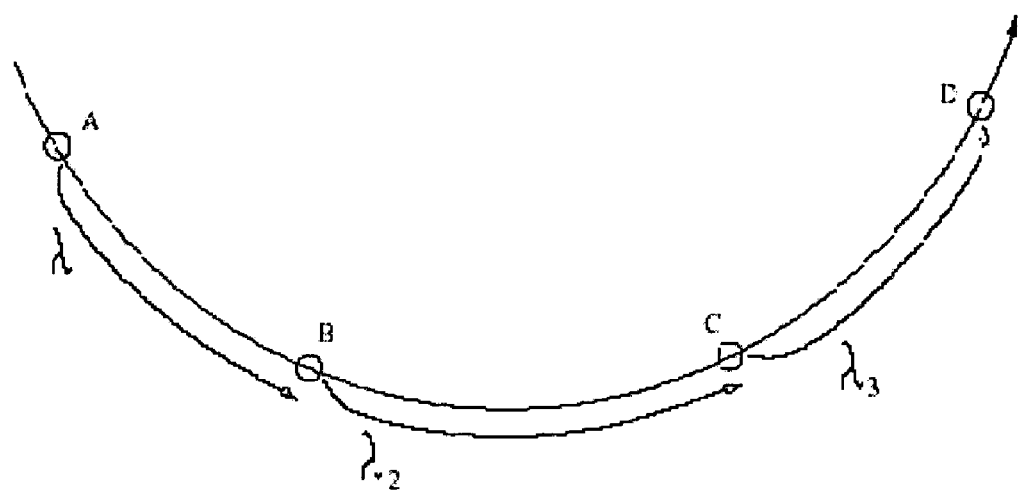
FIG. 17 shows receiver contention among a plurality of nodes.

To preserve TAG path requisition as in FIXED, the receivers are accounted for on the tokens. Although each channel is uniquely represented by one token, there is a one-to-all relationship between a node's receivers and the receiver representations on the tokens (FIG. 16).

A TUNABLE token COMMPATH record (1604) comprises LINK and three extra fields: AVAILRXRS (1614) (idle receiver count), NUMFAILS (1616) (receiver inconsistency offset), and TXFAIL (1618) (an alarm, set in the path source record when a burst is preempted on that token's channel). The LINK field values apply only to the channel of the "token-in-hand," and are generally handled as in FIXED. The AVAILRXRS and NUMFAILS values deal with sink receivers, a shared resource, mirrored across all W tokens. Thus, one node's receiver(s) is (are) tracked in the W distributed AVAILRXRS and NUMFAILS fields.

An AVAILRXRS field for a given node is initialized with the number of receivers actually on line. A NUMFAILS field is initialized with 0. A source node S, holding token $t_j$, claiming a path on channel j to a given sink K, (a) decrements $t_j[K]$.AVAILRXRS and each [K].AVAILRXRS field on the next W−1 tokens; and (b) increments each [K].AVAILRXRS field in the_next_W tokens (i.e., two "receiver accounting life-cycle phases" of ONEROTATION each). The first phase decrements, the last phase increments. Since more than one node can claim the same receiver for reception on different channels, contention will arise. An AVAILRXRS deficit (also termed "going negative") from receiver over-subscription can be detected at two points on the ring, as shown in the following example.

Going Negative

As an illustration of the concepts involved, and as an example to show why the system already outlined does not suffice, consider a system in which each node has one receiver. A node, $S_b$, straddles the channel i path of an upstream source, $S_a$, to a downstream sink K. $S_b$ is said to be "in-path." $S_b$ has earlier claimed the last receiver of K, say on channel j. Sb receives token $t_i$, and decrements the $t_i[K]$.AVAILRXRS field, which goes negative.

(As a brief aside, why do we leave AVAILRXRS negative? If, instead of leaving $T_i[K]$.AVAILRXRS negative, what if Sb was to increment AVAILRXRS to 0? Then could downstream nodes come to grief, believing that there were 0 rather than (−1) receivers available at K? Yes, if the downstream node d was incrementing that AVAILRXRS field due to d's execution of a receiver adding-back phase on that sink, d could think that there was one receiver available, when in fact there was none.)

$S_b$ will siphon the arriving burst, opening its on-off switch, FREEing the burst's path, and setting $S_a$.TXFAIL.

When $S_a$ receives token j, $S_a$ is "off-path," i.e., not straddling the path from $S_b$ to K. $S_a$ decrements the K.AVAILRXRS field, which goes negative. $S_a$ does nothing further. $S_a$ and $S_b$ are the only two nodes that should react to K.AVAILRXRS having a negative value. (Each will propagate the field manipulation to the other tokens.) Unfortunately, each node downstream from $S_a$ and $S_b$ will examine AVAILRXRS and find it already negative, causing the node to react. The desired selective response is enabled by the NUM_FAILS field (1616).

The NUMFAILS Field

Let K.NUM_FAILS be 0 on both token i and j as they arrive at $S_a$ and $S_b$. Let $S_a$ and $S_b$ each claim a path to K (2822). Both $S_a$ and $S_b$ will decrement K.AVAILRXRS (2824). $S_a$ and $S_b$ will do AVAILRXRS field updates at subsequent token arrivals prior to Path Maintenance (2422, 2424). If, in the decremental phase, the sum of (K.AVAILRXRS+K.NUM_FAILS) goes negative, K.NUM_FAILS is immediately incremented, preserving the node's status as the first discoverer of the condition. (Only the first discoverer should and will react, since it is its own burst that is in conflict with the burst advertised on the token.) This usage of the NUMFAILS field enables the following: if the sum of K.AVAILRXRS and K.NUMFAILS goes negative, it will indicate a newly discovered contention. Downstream nodes reading the negative value of K.AVAILRXRS will not react due to the offsetting value of K.NUM_FAILS. For any node in the AVAILRXRS incremental accounting life-cycle phase, K.NUMFAILS, if positive, is decremented to remove the offsetting value.

Figure 32:
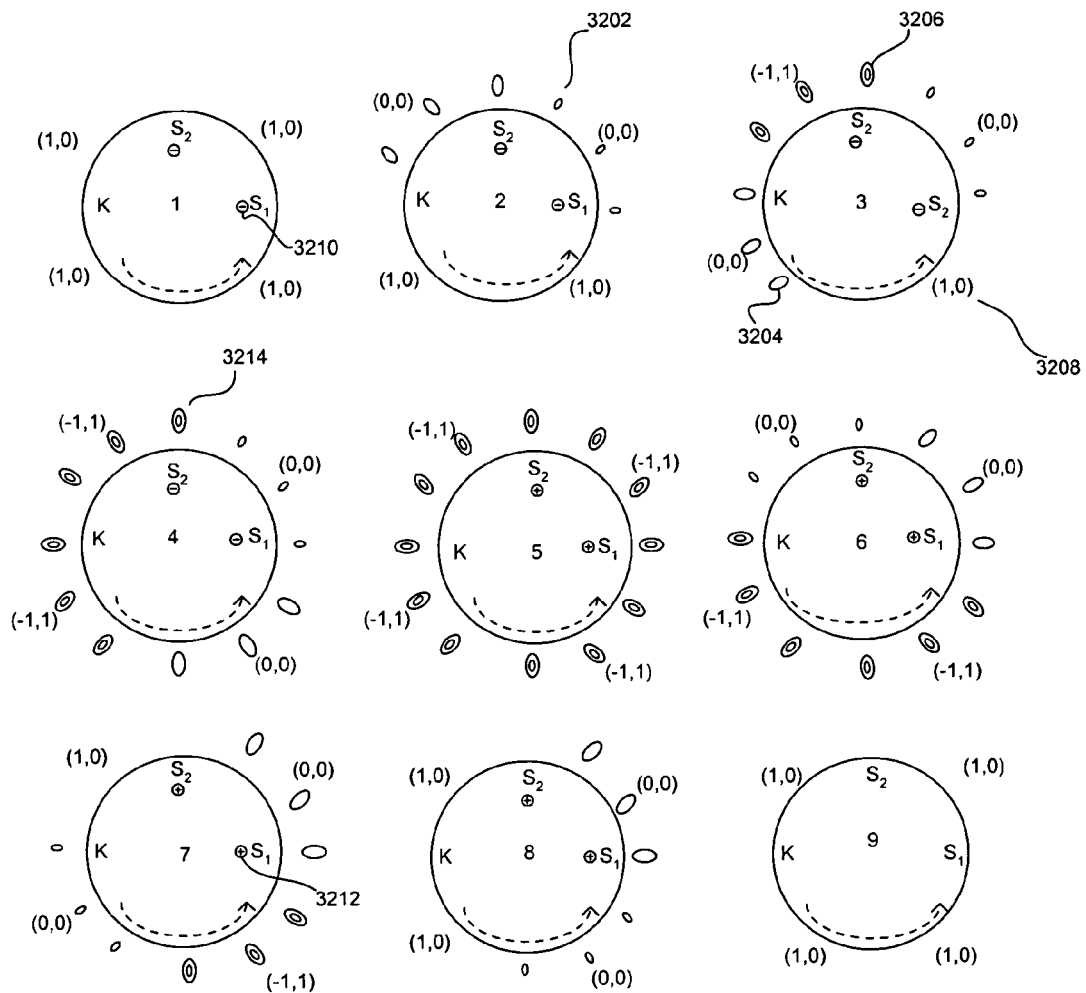
FIG. 32 shows the phases of receiver accounting.

The decremental and incremental phase of the receiver accounting life-cycle are shown in FIG. 32, for a network with 12 channels and 12 tokens. For the sake of this illustration, the network is conceptually divided into quadrants. Each quadrant shows affected tokens as ovals; those affected by $S_1$ are small ovals (3202); those affected by $S_2$ as large ovals (3204);

and those affected by both $S_1$ and $S_2$ as both (3206). The values held by the AVAILRXRS and NUM_FAILS fields of the sink K for the tokens in a given quadrant are shown in parentheses (3208). FIG. 32 shown nine configurations in time-lapse order, numbered 1-9, where each configuration represents the system state at the beginning of the next quarter-rotation of the tokens. The decremental phase is shown in configurations 1-5. Configuration 1 shows nodes $S_1$ and $S_2$ just acquiring their paths to K and about to decrement the tokens. Nodes which are beginning a quadrant of a decremental phase are specially marked (3210). In configuration 5, $S_1$ and $S_2$ change to the incremental phase, which is shown in configurations 6-9. Nodes which are beginning a quadrant of an incremental phase are specially marked (3212).

TANDEM

It may happen that a burst is SIPHONed when there is actually no contention, i.e., even though there are paths to the same sink marked on two different tokens, and there is only one receiver for the two bursts, the node that is SIPHONing has actually finished transmission of its own burst. In this case, the SIPHONing is gratuitous. This case is actually quite common, the more so at lower loads.

To reduce the SIPHONing losses of the TUNABLE system, we introduce a refinement, called TANDEM. In TANDEM, when an AVAILRXRS+NUMFAILS sum goes negative, the node checks to see if its own transmission to that receiver is complete. If not, the arriving burst is siphoned, as in TUNABLE; otherwise, the arriving burst is allowed to continue, and NUMFAILS is incremented to protect it. The changes in TANDEM are largely confined to Update AVAIL RXR LISTs (2422). Until some future token shows a positive AVAILRXRS at K, the node sends no burst to K.

The Update AVAIL RXR LISTs routine developed above is set out in FIG. 27; the inner fork "STOMP" is only used by a higher layer of the protocol, however. More details of Update AVAIL RXR LISTs are discussed in the next section.

URGENCY

Significant fairness problems plague FIXED, TUNABLE, and TANDEM systems at any significant level of system load. In this section, we introduce a scheme based on the notion that data becomes more "urgent" as time passes, and develop the URGENCY layer, which sits on the TUNABLE and TANDEM layers; subsequently, we introduce the RESERVATION layer above that, to take further advantage of the information made available by URGENCY.

In the low-power network, each node maintains a queue for every network destination. In the URGENCY layer (or scheme), queue urgency reflects the urgency value of the burst at head of queue (HoQ). Networking contention or scheduling decisions consider queue urgency and the urgency of bursts in transit. Burst urgency is calculated in queue as bursts are aggregated and awaiting transmission. If classes of service are desired, the burst urgency may be computed while in the queue, based on the service class of the burst contents. This is a straightforward way to implement priority levels.

The urgency value of an empty queue is 0. The urgency value of a burst may start at 1 and may be incremented by one at each "token-tick" (i.e., once for every token arrival). (Implementations with other policy goals might favor differing approaches, perhaps involving priority coding or statistical weightings of various measures in per tick urgency calculation. Since access decisions are made on the basis of queue urgency, burst urgency calculations are opaque to the URGENCY protocol, decoupling the issues of fair burst treatment on the basis of urgency, which is addressed by the node-level protocol, and the urgency computation itself, which is performed by queue internal management. One obvious application would be support for prioritized traffic, as noted above.) Whichever burst (enqueued or in transit) has the highest urgency is favored where possible in contention or scheduling decisions.

Besides the token fields employed by FIXED, TUNABLE, and TANDEM, an extra field, LINK_URG (1608), is used in URGENCY tokens. Field LINK_URG is set to 0 if LINK is FREE; otherwise, LINK_URG is set to the urgency of the burst owning the link. Each node must track the sink, channel, and urgency of each burst in active transmission. Recalculate Urgency (2418) is introduced in URGENCY; and other protocol routines broadly affected include Find Path ((2426), and FIG. 28), Mark Path (2428, 2430, and FIG. 30) and Update AVAIL RXR LISTs (2422, and FIG. 27).

Upon token arrival, Recalculate Urgency labels each destination queue with the urgency level of the burst at the head of the queue (2418). Then in Update AVAIL RXR LISTs (2422), as seen below, fields relating to urgency in both the token and in special, local, receiver accounting data structures are updated, and exert influence on the outcome of any receiver oversubscription involving the node. Next, in Path Maintenance (2524), in light of the token state, URGENCY assesses the various destination queues that have bursts waiting, as in TUNABLE (and TANDEM).

If conditions allow a burst to be sent, the node executes the Find Path algorithm (2528). In Find Path (FIG. 31), the destination list is created with the most urgent bursts at the front; during destination selection (the while loop), destination candidates are taken from the list in sorted order. (In URGENCY, the break statement is unconditional, i.e., the farthest bound of the most urgent destinations is picked. The token field RSV_URG does not exist in URGENCY.) Additionally, the new token path will be marked for urgency as well as ownership, using the LINK_URG field (2430; and FIG. 30). This allows the urgency of the burst in transit to be known (without physically inspecting the burst) downstream by a node which detects receiver over-subscription at the destination.

Downstream from the burst transmission, the burst urgency value is used to decide receiver contentions (FIG. 27, block [3], STOMP fork). Update AVAIL RXR LISTs does receiver accounting at every token arrival as follows (see (2422) and FIG. 27).

The local node data structures TAKE_AWAY_RXR_LIST (blocks [0], [3]) and ADD_BACK_RXR_LIST (blocks [0], [2]) are lists of receiver adjustment records. Each receiver adjustment record comprises a pair of values, (SINK, ADJ). The SINK field identifies the node with the receivers. Values in the ADJ field may range from (−W) to (W−1), indicating how many more tokens must be decremented or incremented. If a node has more than one transmitter/receiver pair, then the node may acquire parallel channels to the same sink, and there can be multiple receiver adjustment records with the same SINK values. Therefore, the values in the SINK fields of the records in the node's RXR_LISTs may not be unique in the list.

In block [2] of FIG. 27, the ADD_BACK_RXR_LIST processing deals with the second accounting life-cycle phase of receiver allocation accounting, that of incrementing the AVAILRXRS field of the sink record. (The ADD_BACK_RXR_LIST must be processed before the TAKE_AWAY_RXR_LIST, since false negatives would be generated when a node is in two different phases of receiver accounting with respect to the same sink, i.e., it has transmitted concurrent bursts on parallel channels.) In block [3], the TAKE_AWAY_RXR_LIST processing deals with the first phase of receiver allocation, that of decrementing the AVAIL-RXRS field of the sink record.

If a node detects receiver over-subscription (block [3], first if); and if the arriving burst and the node's own burst on a different channel are in contention for the same receiver_and_the detecting node is "in-path" (next if); and if its own burst is still in transmission (next if); then it favors the burst of higher urgency as follows.

If the node's own least urgent burst targeted to the destination in question (with multiple transmitter/receiver pairs per node, there may be multiple transmissions active between the same two nodes, on parallel channels) is less urgent than the arriving burst, the node discontinues its own active burst transmission (the STOMPed fork). Contrariwise, if the node's own burst is not less urgent, the arriving burst is blocked using it's channel's on-off switch (the SIPHONed fork). All else in FIG. 27 is as in TUNABLE and TANDEM. This preempting of the transmission of one's own burst is termed STOMPing, as distinguished from SIPHONing the transmission from upstream; and as distinguished from allowing TANDEM bursts to pass unimpeded.

RESERVATION

The RESERVATION scheme is designed to distribute urgency information over the network. Based on this information, networking decisions can be made to favor the queues most starved in the networking system, rather than just those most starved in the node. Every node uses the URGENCY scheme given in the previous section. Each node tries to reserve paths on tokens for the farthest bound of the most urgent of its blocked bursts. A node will not claim a FREE path on a token unless its burst is of higher urgency than any of the reserved links of the desired path.

Besides the token fields employed by FIXED, TUNABLE, and URGENCY, two extra fields are used in RESERVATION tokens, RSV_ID and RSV_URG (1610, 1612). Field RSV_ID is set to (−1) if the link is not reserved; otherwise, RSV_ID is set to the identification number (ID) of the burst owning the link reservation. Field RSV_URG is set to 0 if RSV_ID is set to (−1); otherwise, RSV_URG is set to the urgency of the burst owning the link reservation. The Reset Reservation (2420) and Reserve Links (2432, and FIG. 29) routines are new in RESERVATION; and Find Path (FIG. 31) is also affected. RESERVATION works as does URGENCY, except as follows.

Upon token arrival, Reset Reservation (2420) simply erases any "stale" reservation held by the node itself, since the burst for which the path was reserved may have been transmitted in the meantime. In Find Path (FIG. 31), during destination selection (the while loop, second if), a destination candidate is disqualified if any link on the path leading to it has a RSV_URG no less than the candidate burst's urgency.

Path Maintenance (2424) attempts to claim a path on the token. Reserve Links (FIG. 29), which executes afterward, may attempt to reserve a future path on the token for the most urgent burst still waiting, using the token record fields RSV_ID and RSV_URG. In Reserve Links, a while loop qualifies the reservation candidates as follows.

If no burst is waiting, Reserve Links exits, doing nothing. Otherwise, the destination queue bound for farthest downstream is selected from the set of destination queues of highest urgency. If any RSV_URG field on the way downstream to the candidate destination is not lower than the urgency of the candidate destination queue, then the candidate is rejected, and the loop repeats. If the candidate's urgency is higher than all other reservations on its path, Reserve Links falls through the loop, and the path is reserved as follows.

The node IDs of any preempted reservations at the first and last links of the new reservation path ("first loser" and "last loser") are saved (the IDs are found in their RSV_ID fields on the token). The path of the new reservation is marked with the node's ID in RSV_ID and burst urgency in RSV_URG. The "first loser" and "last loser" links may have been links in preempted path reservations which were only partially overlapping the new reservation. Therefore, link reservations extending upstream from the new path are erased if they have "first loser" ID, and the same is done downstream for any "last loser" links.

This concludes the discussion of the inner network per se. The changes required to gain a greater network connectivity than that of a ring topology are disclosed in the MESH sections below, and should be understood in the context of the Inner network as disclosed here.

Path Establishment and Manipulation in a Mesh Network

Ring networks have many advantages. A ring can be configured to survive a fiber cut with a bounded time of service recovery. A ring offers a closed, predictable environment with deterministic behavior. But ring networks are not without their critics. One disadvantage of a ring network is the ring topology itself, which does not allow data to travel many alternate routes. The invention disclosed here allows the Reference Network to take advantage of additional links, i.e., what is known in popular telecommunications terminology (though not in graph theory) as a "mesh" topology. However, the invention is not a mesh as it is commonly conceived. At any given moment, the available topology is still a ring, but the particular ring varies dynamically to take advantage of the "extra" links to bypass congestion downstream. We term these extra links, which do not lie on the primary ring, "chords." A chord may not have any intermediate nodes, i.e., a node must lie on the primary ring, regardless of how many chords issue from or terminate. The basic idea is that, in operation, the ring-based protocol defaults to the "primary ring," exactly as in the Reference Network. However, data may be "detoured" across "legal," "extra" links on a wavelength by wavelength basis, "bypassing" congestion (or "contracting"), and reverting to the larger ring ("snapback") afterward.

The Reference Network protection invention is based solely on the primary ring, and has not been adapted to be aware of nor be effective in the face of network traffic using the "extra" links, so there is a functional disconnect between this protocol and the protection portion of the Reference Network protocol in terms of foreseen behavior in the face of any fault that invokes self-healing ring automatic protection switching. Thus, this mesh invention is fundamentally disjoint with the Reference network in terms of the protection and survivability of critical communications in the paradigm of the Reference Network. However, the very idea of dynamic rerouting of individual wavelengths around arbitrary portions of the network (within the constraints of the actual locations of the "extra" links, of course) may lend itself to a different survivability scheme. With that said, the mesh invention integrates surprisingly easily into the protocol framework of the remaining inventions. Still, it is worth repeating that, although the embodiment presented here is integrated with the other inventions, the integration is not required, and individual inventions may be used stand-alone or in any combination.

MESH Architecture

A low-power node consistent with the MESH invention is shown in FIG. 34. (A FIXED node, not shown, could work as well, changing the position of the taps for the receivers (3418) to a position just downstream of the data channel demultiplexer (3434) and just upstream of the on-off switches (3436).) The physical requirements for such a node include space switches (3438), for example 1×2 or 1×4 switches, on each data channel (3432) of a node which is on the "upstream" end of a chord (3442). These switches allow each data channel to be individually routed over either the primary ring fiber (3444) or any of the downstream chord fibers (3442). Here, only one chord is shown downstream (3442) and one upstream (3426). The tunable transmitters (3414) each have their own space switches (3448) so the node can direct its own bursts to the proper fiber. These space switches (3438, 3448) should be of a speed consistent with the amount of latency provided by the fiber delay loop (3430). The control channel (3406) is always routed to the primary ring (3446).

It seems likely that, in many implementations, the number of chords in a network would be relatively sparse, i.e., no more than a few chords would issue from any one node. In any event, no wavelength conversion is required by MESH, and the cost of small switches in bulk is anticipated to be reasonable, especially as advances in packaging begin to allow for their manufacture in arrays.

At the "downstream" end of a chord (3426), a passive optical combiner (multiplexer) (3422) is used. Since the nodes on the "bypassed" arc of the primary ring are prevented by the protocol from initiating any transmissions while they are thus isolated, and since the bypass is not initiated in the presence of a conflicting transmission, blocking of interference at the combiner is unnecessary (at least in the logical architecture). The tokens still circulate in the primary ring, in the same token channel, and are not routed across the chords. To account for the difference in transit times between the token on the primary ring and the data on the chord, the source of the data may calculate the temporal offset and delays the transmission of the data by an appropriate amount. This may also serve to help offset switch delay, except on snapback. Alternatively, chords may be physically constructed to be a length equal to the distance a burst would have traveled had it gone around the primary ring between the source and destination in question.

MESH Protocol

Certain changes to the Inner network protocol are required to add the MESH functionality. These changes are described below with reference to the material already disclosed above in the sections relating to the Inner network protocol.

A ring identifier (RI) is a value that uniquely describes a cycle in the network, possibly utilizing one or more chords. The default RI is the primary ring. The set of all RIs is compiled when the network is constructed, before it is in operation, and disseminated to the nodes. Each node keeps track of how its space switch must be configured in the presence of each RI, in order to direct the channel either to the primary ring or to a chord.

Since the tokens still circulate in the primary ring, regardless of which wavelengths have been detoured over chords, the bypassed nodes are able to clear their own active links in the token when transmissions on the bypassed arcs are complete. Such a bypassed node will not be able to initiate a new transmission nor manipulate reservations, however (2816, 2818, 3120). Only the source node transmitting upon a given chord will be able to give the command to snapback the network away from that chord. Upon completing its own transmission across the chord, the node with the token-in-hand will cause the network to snapback, by (1) listing the chords with active transmissions, (2) selecting the largest ring which doesn't exclude the listing ring, and (3) setting the RI field to that ring (2518, 2520). In the case where the node changing the RI also has the switch indicated, it must act at the same time (2520).

A bypassed portion of the primary ring is said to be "grayed-out." It is unnecessary for nodes in a non-grayed-out area to consider anything that nodes in a grayed-out area might be doing, since there will be no transmissions emanating from a grayed-out area. Similarly, transmissions between nodes in the same grayed-out area continue unaffected, and no interaction with nodes in the non-grayed out area will need to be considered. Again, this is with respect to a given channel, since different channels will have differing RIs, during the normal course of data communications.

Also note that the logical snapback is performed only on the token. The physical snapback (switching) is performed by the node which has the switch, according to the value in the RI field in the token it receives (1620, 2406, 2408). When an RI is noted, the switches affected, both the on-off (3436) and space switches (3438; and 3448—in the case of transmission over a local chord) are indicated explicitly, as follows. The token-in-hand specifies (1602) which channel to tune to (3410), and the RI (1620) used indicates which fiber (primary (3444), or chord(s) (3442)) to switch to (3448); clearly, there can be only one link downstream from a given node on a given channel. In the case in which the node that is changing the RI in the process of initiating its own transmission also has the switch indicated (3120, 2820), it must act at the same time (3130, 2820).

Integration of QoS and MESH Inventions

The effect of all the MESH innovations on the urgency and reservation portions of the protocol (URGENCY and RESERVATION) is surprisingly slight. In RESERVATION, the path reservation (as opposed to path requisition) routines remain unchanged for both the nodes in the active and in the grayed-out portions, i.e., the decisions remain base upon the urgency of queued bursts for both the active and the grayed-out portions of the token. Therefore, it may be that some of the routines of the RESERVATION layer may be varied in a number of ways to produce various ways of shaping the flow of traffic in some network implementing the RESERVATION scheme. Consequently, reservations may be made without regard to the current RI. Similarly, reservations may be viewed to be implicitly "contracted" during bypass, so long as neither source nor sink is bypassed. Reservations can always be preempted and erased if the urgency of the reserving source is less than the current urgency of the node acting on the token. The same can be said for all the URGENCY routines, although URGENCY has no influence over the shaping of traffic in the way that RESERVATION may. So all of the reservation and urgency routines remain unchanged, working equally on grayed-out and active portions of the token, indiscriminately.

Note that a node with a token-in-hand makes all of these decisions based only on the rules (protocols) and the token state, and that all aspects of network control remain distributed. A detailed, context sensitive description of those processes peculiar to the MESH networking system follows, with reference to FIGS. 16 and 34 for illustration.

Figure 28:
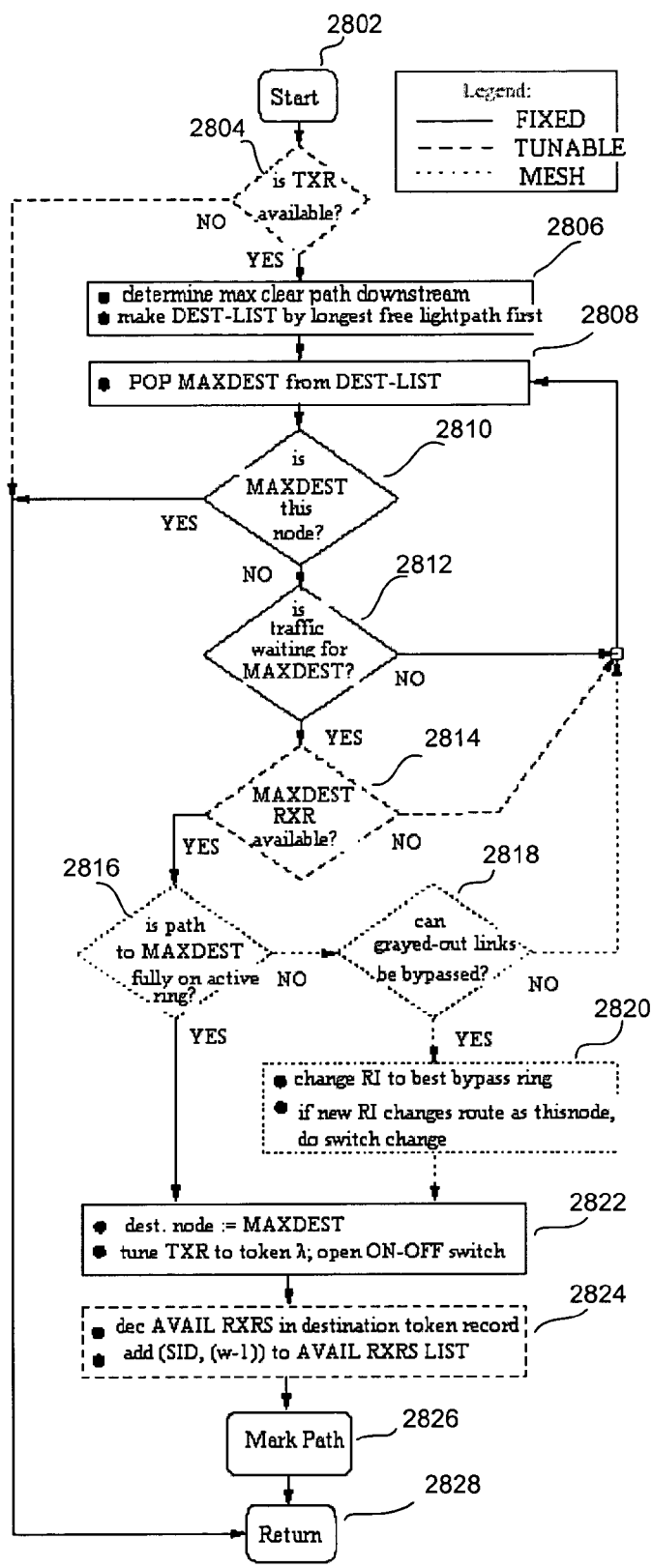
FIG. 28 shows the Find Path Procedure (FIXED, TUNABLE, MESH)
Figure 30:
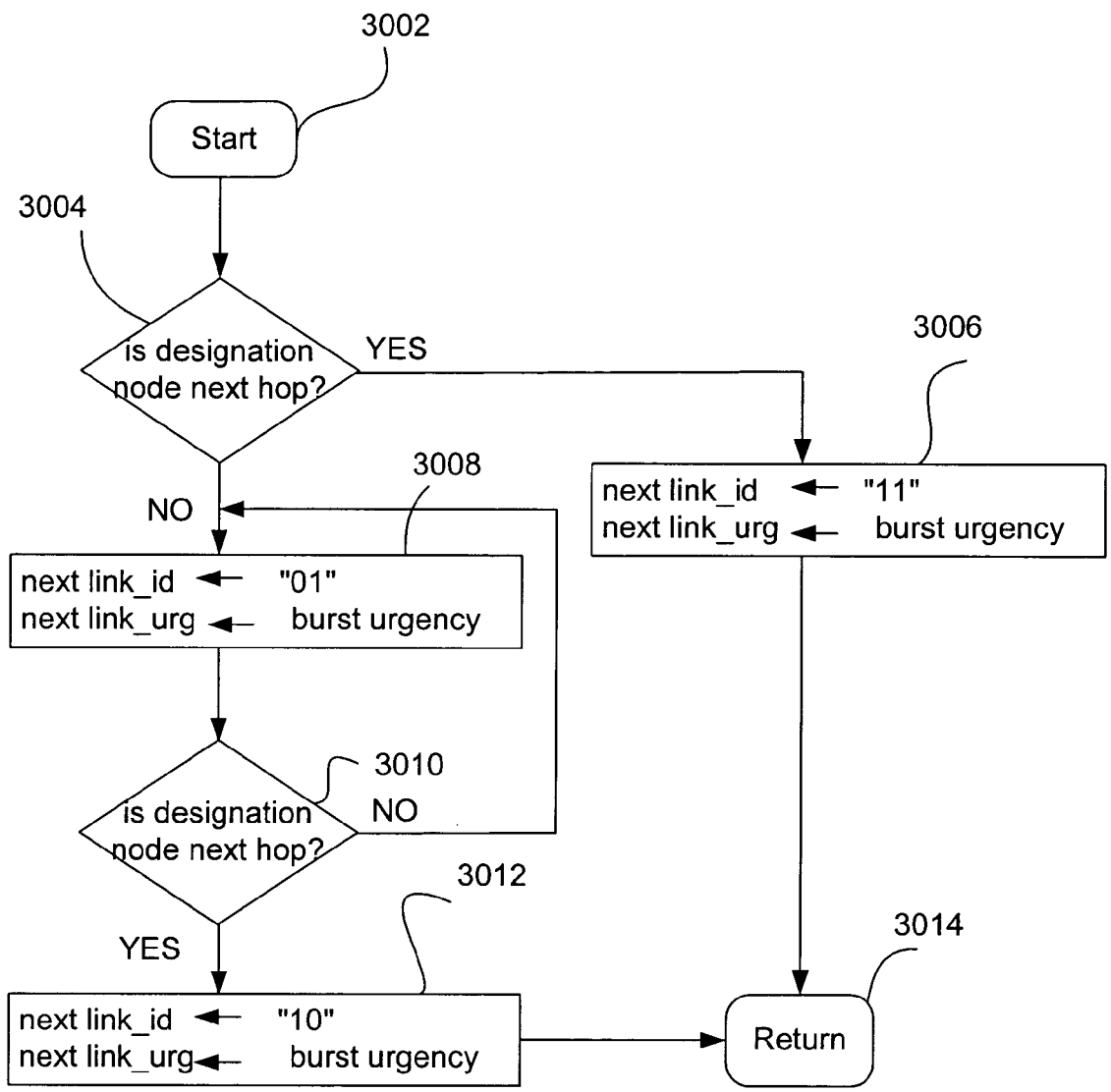
FIG. 30 shows the Mark Path Procedure (Mark Path Urgency Procedure)

In FIG. 24, the space switches (3438) are made to conform to the RI of the incoming token (1620, 2406, 2408). In FIG. 25, logical, and perhaps physical, snapback (2518, 2520) is performed in conjunction with path teardown (2516). Also in FIG. 25, importantly, when resetting a path which is interrupted by a grayed-out area (2522), grayed-out links are not touched. In FIGS. 28 and 31, paths are only set up condional on the ability to bypass grayed-out links and nodes (2816, 2818; 3120); and path requisition is accompanied by choice of a bypass chord (2820, 3130), and a switch change if so indicated (2820, 3130). In FIG. 30, importantly, grayed-out links are not marked; grayed-out links (specifically, fields (1606, 1608, 1614, 1616, 1618)) will only be altered by the nodes involved in the grayed-out communication.

This concludes the detailing of the MESH structure and functionality.

Appendix I: Token Structure in the Reference Network

FIG. 31 illustrates one embodiment (3100) of the present token scheme. The token (1600) can comprise a number of fields. For example, the first field (1602) can be a channel identifier. The channel identifier might be a two-bit or greater field. A second field (1604) can be a channel path status indicator. This field comprises a plurality of two-bit sub fields. The number of sub fields is equal to the number of links in the network. The data in the sub fields is used to advertise available bandwidth, active transmissions, sources, and sinks.

The correlation between the physical topology of the network and the field (1604) is better illustrated in FIG. 16b. An example network (1650) is shown having five nodes, designated A, B, C, D, and E. Further, a link is shown between each adjacent pair of nodes on the ring network. The links are designated A', B', C', D' and E'. Hence there are five links, there are five two-bit subfields in token (1604). With no data sources or sinks, each subfield is set to a default value (00).

Four values for the two-bit subfield exist: (00), (01), (10), and (11). The value (00) means that the corresponding link is currently available. In other words, the communication channel corresponding to that token is available to be used between this node and the next. A value of (01) means that the link associated with that subfield is either a "source link" or an "intermediate link". In other words, a link designated (01) is is always downstream from the source node of the data transmission and is not the destination node. The value (10) means that the corresponding link is a "destination link". In other words, the node immediately downstream from the link so designated is the destination for the data transmission. Finally, the designation (11) means that the link is the only link between the source of the data transmission and its destination (a one-hop communication path).

FIG. 16c provides an illustration tying the physical ring network to the tokens on the control channel $C_0$. In this example, there are again five nodes on a ring network and five links. A customer linked to node B makes a request to download a movie from a SAN connected to node E. At the same time, another customer on node C wants to request the last five years of its corporate tax records from its accountant located on node D. The tokens for channels 1 and 2 ($C_1$ and $C_2$) would be rewritten at nodes B and C respectively, as shown. These two tokens would be transmitted on the control channel $C_0$. In this example, the two tokens (1600a, 1600b) are shown having fields (1602) designating a channel and (1604) showing the link availablity.

For the first request, a token (1600a) designated communications channel $C_1$ as carrying the customer request. Further, token (1600a) also has five subfields, each corresponding to the five links in the network. Since node B is the source of the data request, the subfields for links C' and D' are designated (01) while the subfield for link E' is designated (10). When node E reads this token, it will know to look at channel $C_1$ for the data request.

For the second request, a second token (1600b) is rewritten at node C so that the subfield for link D' is (11). Further, channel field (1602) is provided a value for communication path $C_2$. Thus, when node D reads this token (1600b), it will know to look at channel $C_2$ to the second data request.

Referring now to FIG. 16d, the recipients of the data requests at nodes E and D, respectively, have transmitted the requested data back to the network and to the requesting customers. While it is typical that the requested data would reenter the network at the initial destination nodes, this is not invariant. In other words, the requested data may reenter the network at a different node. For simplicity, our example will have the data reenter at the initial destination nodes. However, the data providers are now the source and the customers are the destinations or sinks. Therefore, on the control channel, an available data channel, for example $C_7$, is identified by node E by reading the tokens. Node E then rewrites the token for $C_7$ to designate that node B is the destination for the movie data located on channel 7. Thus, the subfield for link A' will be (01) and the subfield for link B' will be (10). When node B reads this token, it will look to $C_7$ for the movie data. Likewise, the request for tax records received at node D can be transmitted back on channel 9. Thus the token for $C_9$ is altered at node D so that subfields for links E', A' and B' will be (01) and the subfield for link C' will be (10).

Note that a node may terminate a communication path from upstream and be the source for another communication path on the same communication channel, simultaneously. Unlike Fumagalli, the present invention's use of an expanded token allows the same channel to be used by non-overlapping contiguous portions of the network simultaneously. For example, FIG. 16e illustrates the scenario where two separate data transmissions are sent over the same channel simultaneously. A first request is sent from node A to node B, while a second request is sent from node B to node D. The token (1600c) for the present invention would designate the subfield for link B' as (11). Likewise, the subfield for link C' would be a (01) and the subfield for link D' would be (10). Fumagalli's token would only have a (1) (1) (1) value for the subfields asociated with links B' C' and D' respectively. Thus, node C, when reading a Fumagalli style token would not be capable of distinguishing whether it should pass the data transmission on further or read it as the destination node.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

I claim:

1. An optical network having nodes and optical links between nodes, comprising:
    a plurality of data channels;
    a control channel;
    tokens which pass between nodes on the control channel;
    wherein tokens advertise availability of receivers at a destination node and notify a source when a transmission did not succeed; and
    wherein nodes evaluate the tokens to determine if a data payload is destined for and simultaneously arriving at that node on one of the data channels; and wherein each token carries a first field for advertising availability of receivers and a second field for notifying a source when a transmission does not succeed due to receiver preemption.

2. The network of claim 1, wherein the tokens notify a source when a transmission did not succeed due to receiver preemption.

3. The network of claim 1, wherein each node of the network has fewer transmitters and receivers than data channels.

4. The network of claim 1, wherein the first field of a first token includes a count of the available receivers at a destination node, and wherein the count is decremented by a transmitting node when the transmitting node claims a receiver at the destination node.

5. The network of claim 4, wherein if the count is negative, an intervening node between the transmitting node and the destination node will stop a data payload associated with the first token.

6. The network of claim 1, wherein tokens comprise subsets each associated to a RX/TX waveband range and are treated collectively during configuration.

7. The network of claim 1, wherein contiguous paths between nodes are separately represented in the token.

8. The network of claim 1, wherein transmitting nodes reserve apparently available receivers at downstream nodes without external confirmation.

9. The network of claim 1, wherein tokens include a field of at least two bits indicating communication link status, wherein a first value indicates that the corresponding link is currently available, a second value indicates that the corresponding link is either a source link or an intermediate link between a source and destination, a third value indicates that the corresponding link is a destination link, and a fourth value indicates that the link is the only link between the source node and the destination node.

10. An optical network comprising nodes and optical links between nodes, comprising:

a plurality of data channels;

a control channel;

tokens which pass between nodes on the control channel;

wherein nodes evaluate the tokens to determine if a data payload is destined for and simultaneously arriving at that node on one of the data channels; and wherein each token includes an indication of a path reservation and an indication of a priority for the path reservation.

11. The network of claim 10, wherein tokens advertise availability of receivers at a destination node and notify a source when a transmission did not succeed.

12. The network of claim 10, wherein each node of the network has fewer transmitters and receivers than data channels.

13. The network of claim 10, wherein path reservations can be overridden by higher urgency path reservations.

14. The network of claim 10, wherein transmitting nodes reserve apparently available receivers at downstream nodes without external confirmation.

15. The network of claim 10, wherein the network comprises a ring topology.

16. An optical network having nodes and optical links between nodes, comprising:

a plurality of data channels;

a control channel;

chords between selected nodes of the network;

tokens which pass between nodes on the control channel;

wherein nodes evaluate the tokens to determine if a data payload is destined for and simultaneously arriving at that node on one of the data channels;

wherein nodes and links comprise a ring topology, the default ring being a primary ring; and wherein chords connect non-contiguous nodes of the ring topology.

17. The network of claim 16, wherein data may be diverted from the primary ring to bypass a node by sending the data across a chord.

18. The network of claim 16, further comprising switches at the nodes to divert data from the primary ring to a chord.

19. The network of claim 18, wherein a token associated with the diverted data remains on the primary ring and arrives substantially simultaneously with the associated token at a destination node.

* * * * *